(12) United States Patent
Kurokawa

(10) Patent No.: US 11,785,188 B2
(45) Date of Patent: Oct. 10, 2023

(54) IMAGE PROCESSING APPARATUS AND IMAGE PROCESSING METHOD

(71) Applicant: SONY GROUP CORPORATION, Tokyo (JP)

(72) Inventor: Masuyoshi Kurokawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 9 days.

(21) Appl. No.: 17/609,875

(22) PCT Filed: May 12, 2020

(86) PCT No.: PCT/JP2020/019019
§ 371 (c)(1),
(2) Date: Nov. 9, 2021

(87) PCT Pub. No.: WO2020/235400
PCT Pub. Date: Nov. 26, 2020

(65) Prior Publication Data
US 2022/0224867 A1    Jul. 14, 2022

(30) Foreign Application Priority Data
May 20, 2019 (JP) ................. 2019-094285

(51) Int. Cl.
*H04N 9/31* (2006.01)
*H04N 5/74* (2006.01)

(52) U.S. Cl.
CPC ................ *H04N 9/31* (2013.01); *H04N 5/74* (2013.01)

(58) Field of Classification Search
CPC .... G03B 21/006; G03B 21/008; G03B 21/28; G03B 21/147; G03B 21/208;
(Continued)

(56) References Cited

U.S. PATENT DOCUMENTS 8,061,854 B2 * 11/2011 Shirai .................. G09G 3/3406
353/31
8,870,386 B2 * 10/2014 Kasuya .................. G03B 17/54
353/69
(Continued)

FOREIGN PATENT DOCUMENTS

CN     106464825 A    2/2017
JP     2005-151418 A  6/2005
(Continued)

OTHER PUBLICATIONS

International Search Report and Written Opinion of PCT Application No. PCT/JP2020/019019, dated Jun. 23, 2020, 09 pages of ISRWO.

*Primary Examiner* — Sultan Chowdhury
(74) *Attorney, Agent, or Firm* — CHIP LAW GROUP

(57) ABSTRACT

Provided is an apparatus that includes an image projection section that performs an image projection process based on a PWM method, an output image control section that sets a portion of a single-frame output period of a view-use image as a period in which to output a pattern image to be used for calculating an image correction parameter, a correction parameter calculation section that calculates the image correction parameter with use of the pattern image captured by a camera in the pattern image output period, and an image correction section that performs a correction process on the view-use image with use of the image correction parameter. The output image control section controls the pattern image output period in such a manner that pixel values of the pattern image fall within a range from a minimum pixel value to less than a minimum significant pixel value of the view-use image.

12 Claims, 20 Drawing Sheets

(58) Field of Classification Search
CPC .. G03B 21/2053; G03B 21/2066; H04N 9/31; H04N 9/315; H04N 9/3123; H04N 9/3185; H04N 9/3194
See application file for complete search history.

(56) References Cited

U.S. PATENT DOCUMENTS

| | | | |
|---|---|---|---|
| 2014/0022516 A1* | 1/2014 | Mizuno | G03B 21/206 353/121 |
| 2015/0172591 A1* | 6/2015 | Nobori | H04N 9/3102 348/759 |
| 2015/0187057 A1* | 7/2015 | Kobayashi | H04N 9/3185 345/647 |
| 2017/0142381 A1 | 5/2017 | Kaji | |
| 2017/0208309 A1* | 7/2017 | Oike | H04N 9/315 |
| 2019/0052850 A1* | 2/2019 | Iguchi | H04N 9/3126 |

FOREIGN PATENT DOCUMENTS

| | | |
|---|---|---|
| JP | 2017-047794 A | 3/2017 |
| WO | 2016/002510 A1 | 1/2016 |
| WO | 2017/104447 A1 | 6/2017 |

\* cited by examiner

FIG. 6

| GRADATION | PIXEL OUTPUT SETTING | OUTPUT PIXEL |
|---|---|---|
| 255 | | □ |
| 254 | | □ |
| .. | | .. |
| 223 | | ▣ |
| .. | | .. |
| 191 | | ▨ |
| .. | | .. |
| 31 | | ■ |
| .. | | .. |
| 0 | | ■ |

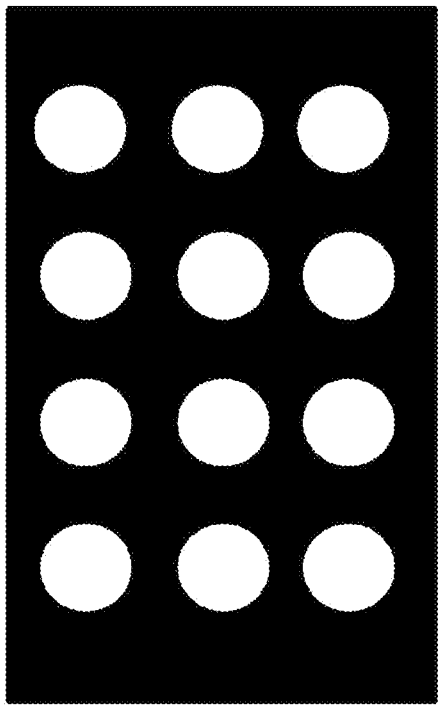
FIG. 7B  PATTERN IMAGE
(IMAGE FOR CORRECTION PARAMETER CALCULATION)
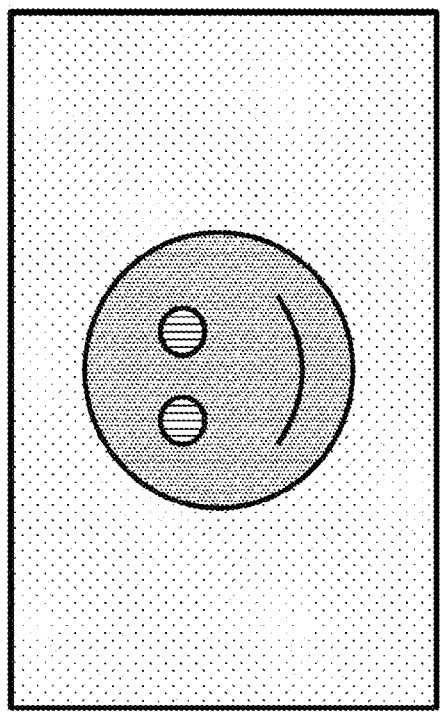
FIG. 7A  VIEW-USE IMAGE

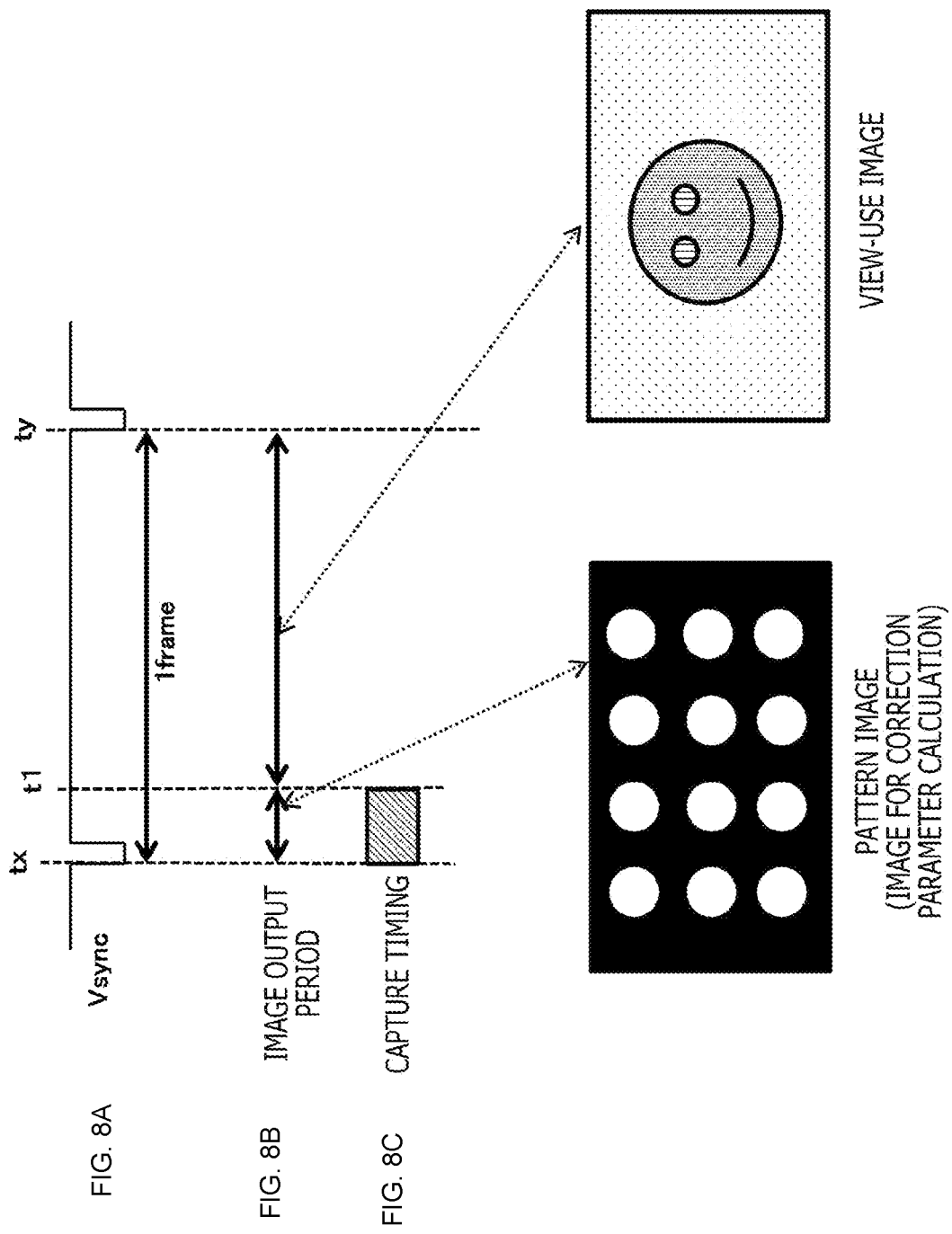

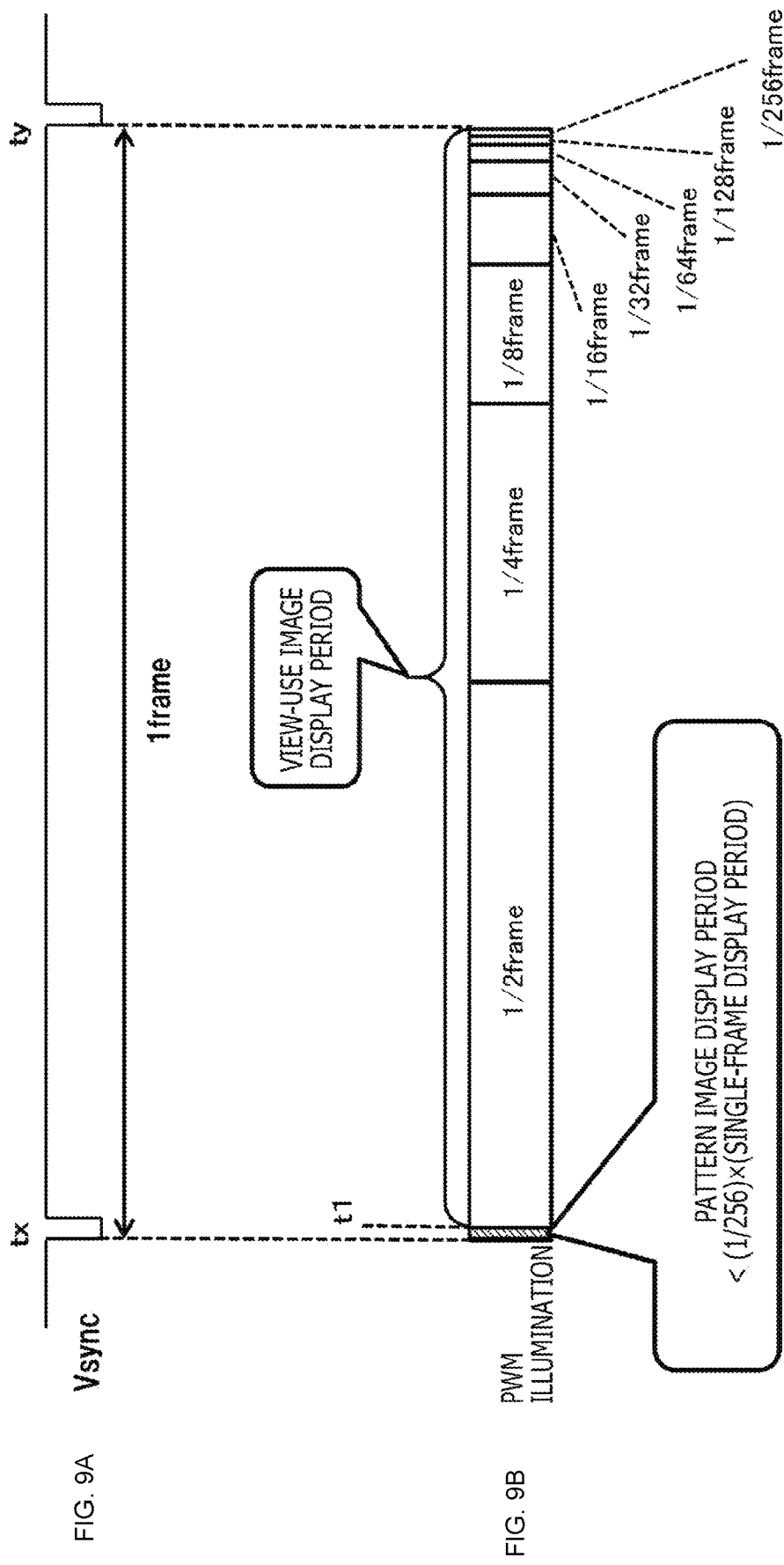

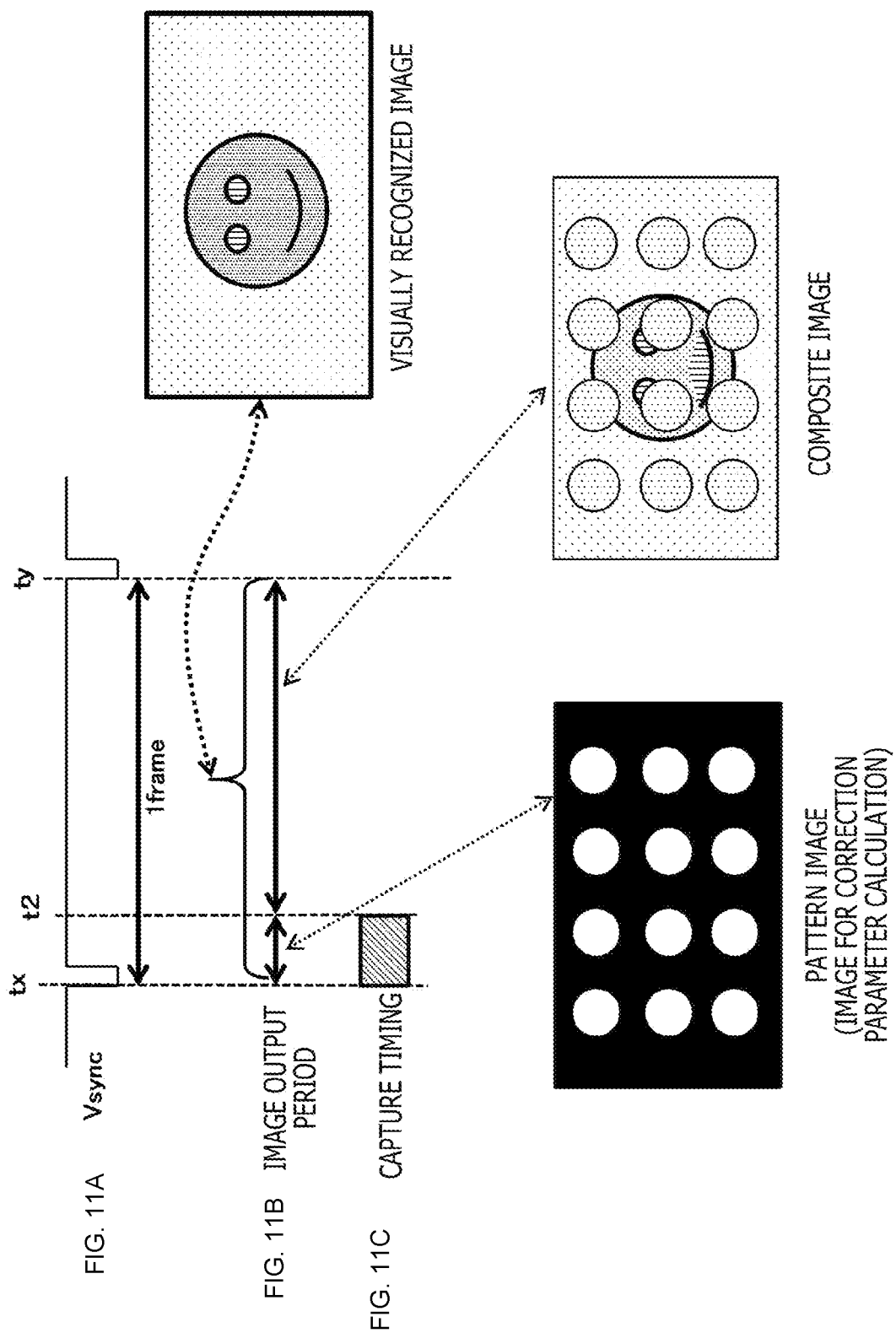

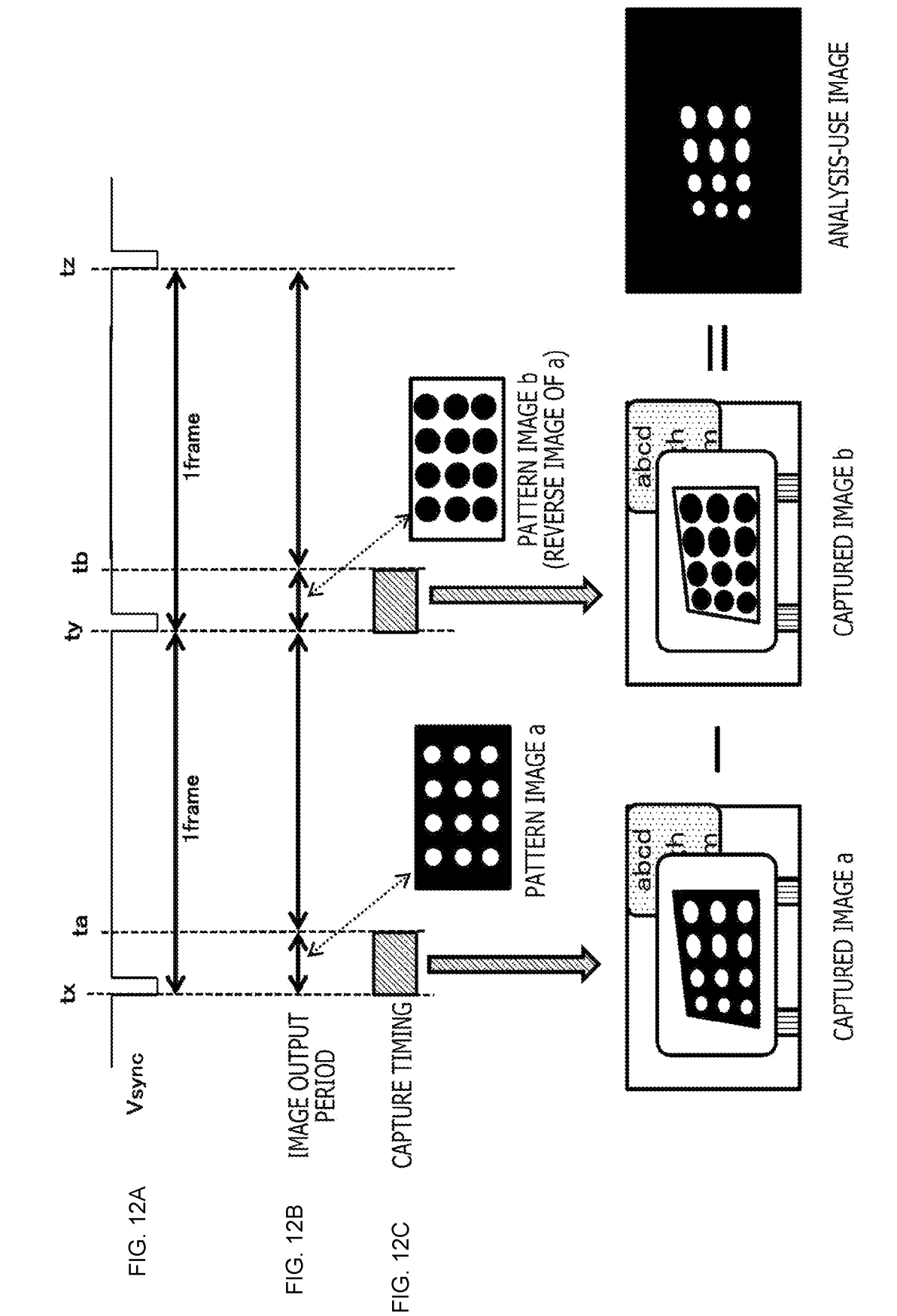

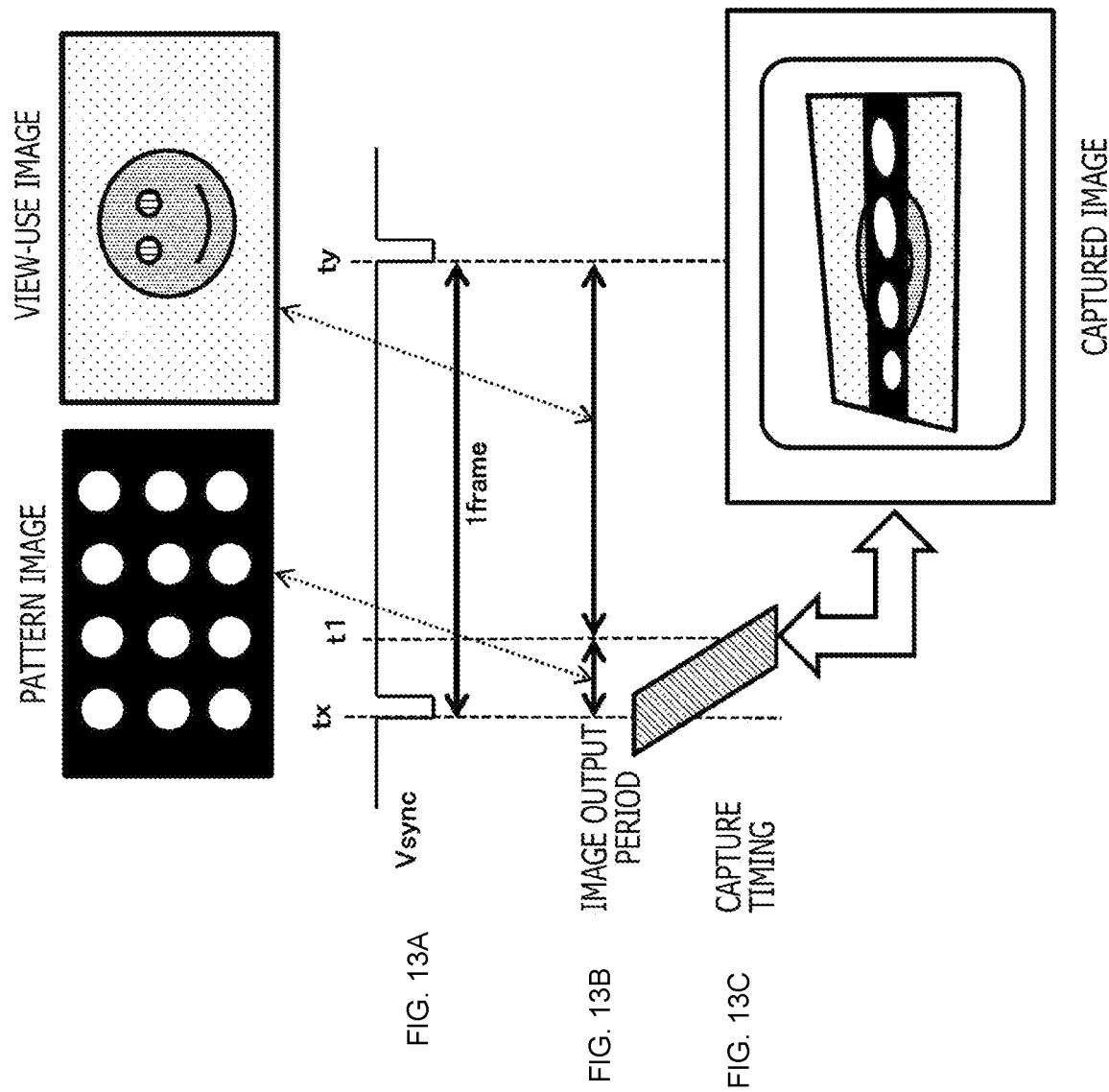

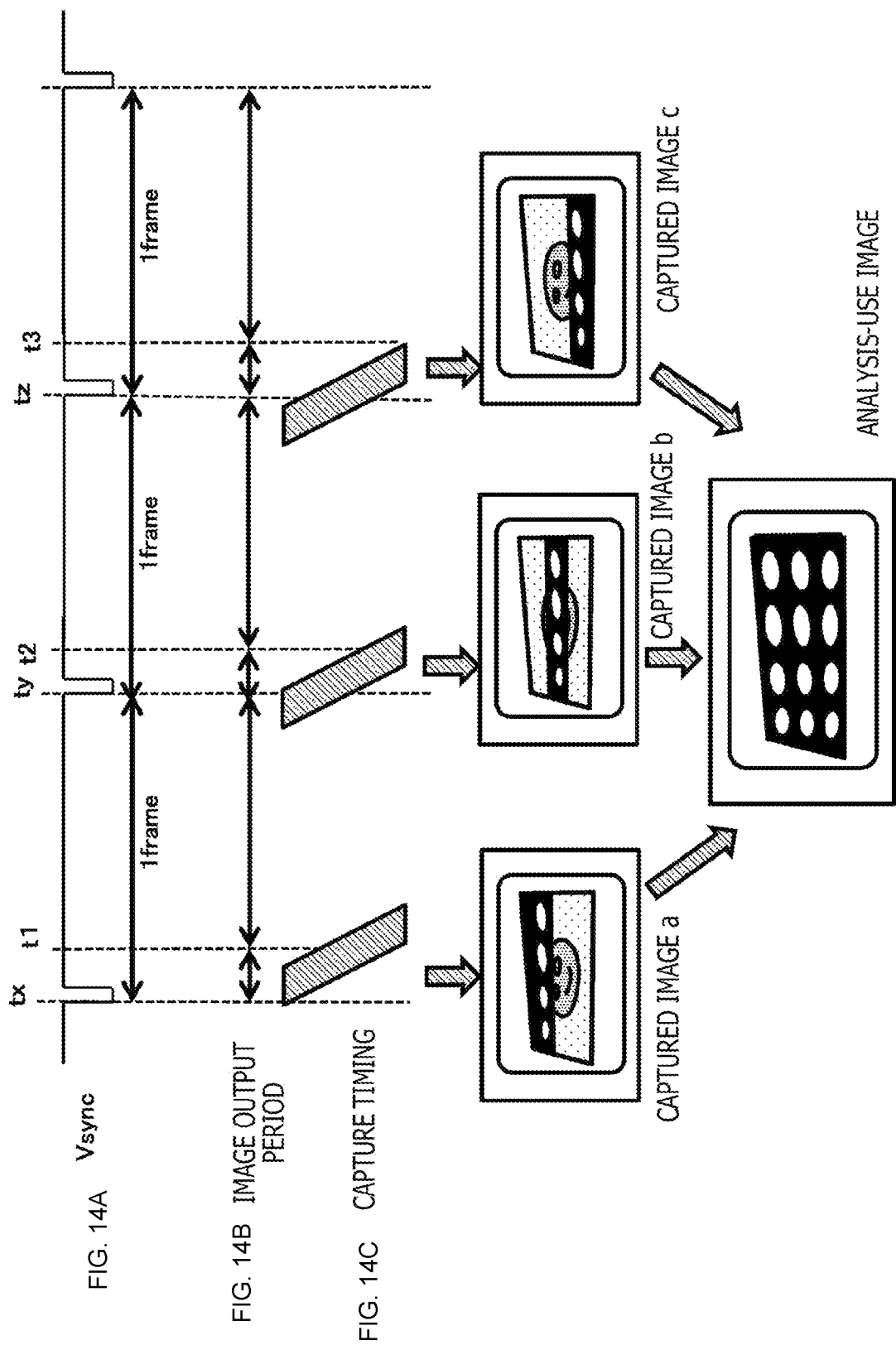

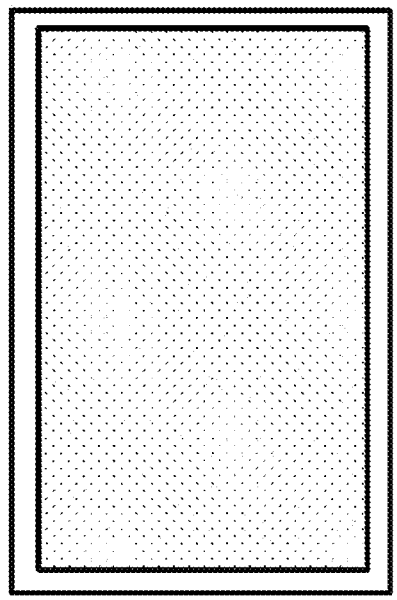
FIG. 15A  PATTERN IMAGE EXAMPLE 1
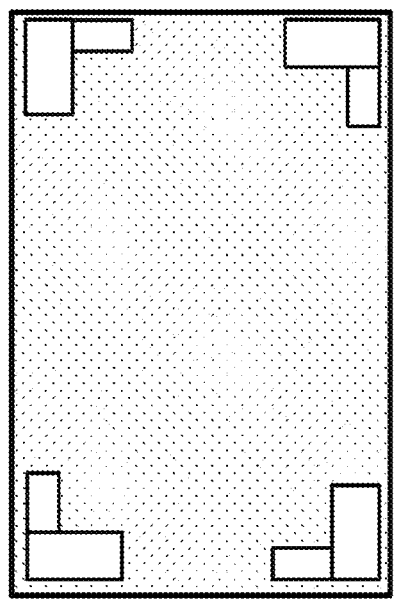
FIG. 15B  PATTERN IMAGE EXAMPLE 2

FIG. 16
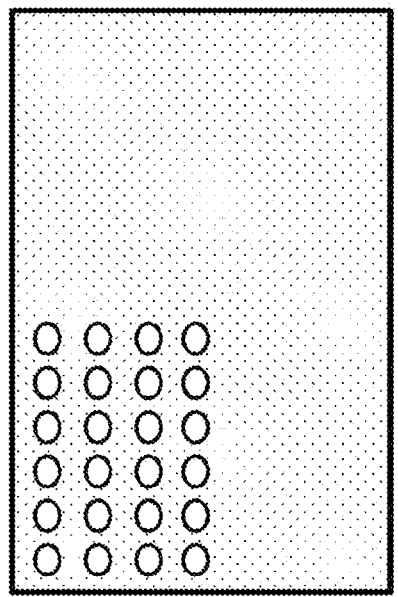
PATTERN IMAGE EXAMPLE 3b
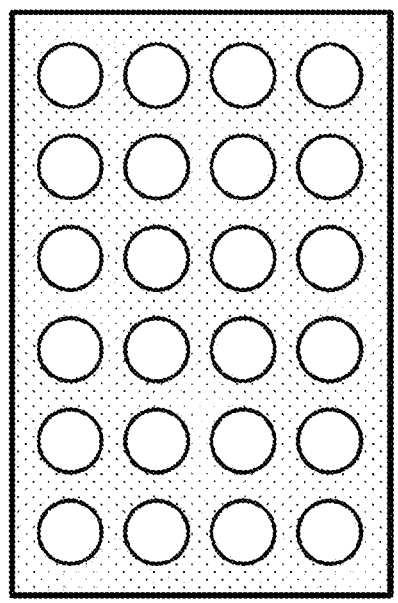
PATTERN IMAGE EXAMPLE 3a
PATTERN IMAGE EXAMPLE 3

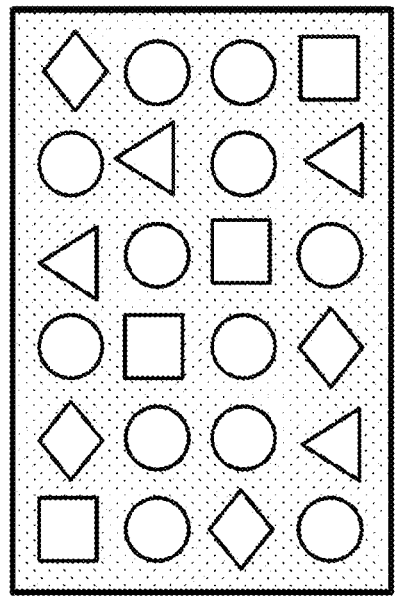
FIG. 17B    PATTERN IMAGE EXAMPLE 5
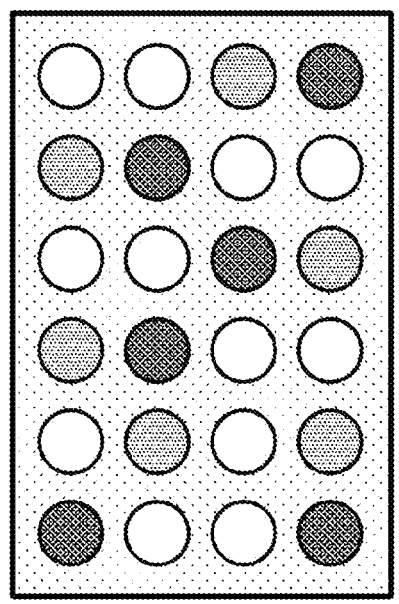
FIG. 17A    PATTERN IMAGE EXAMPLE 4

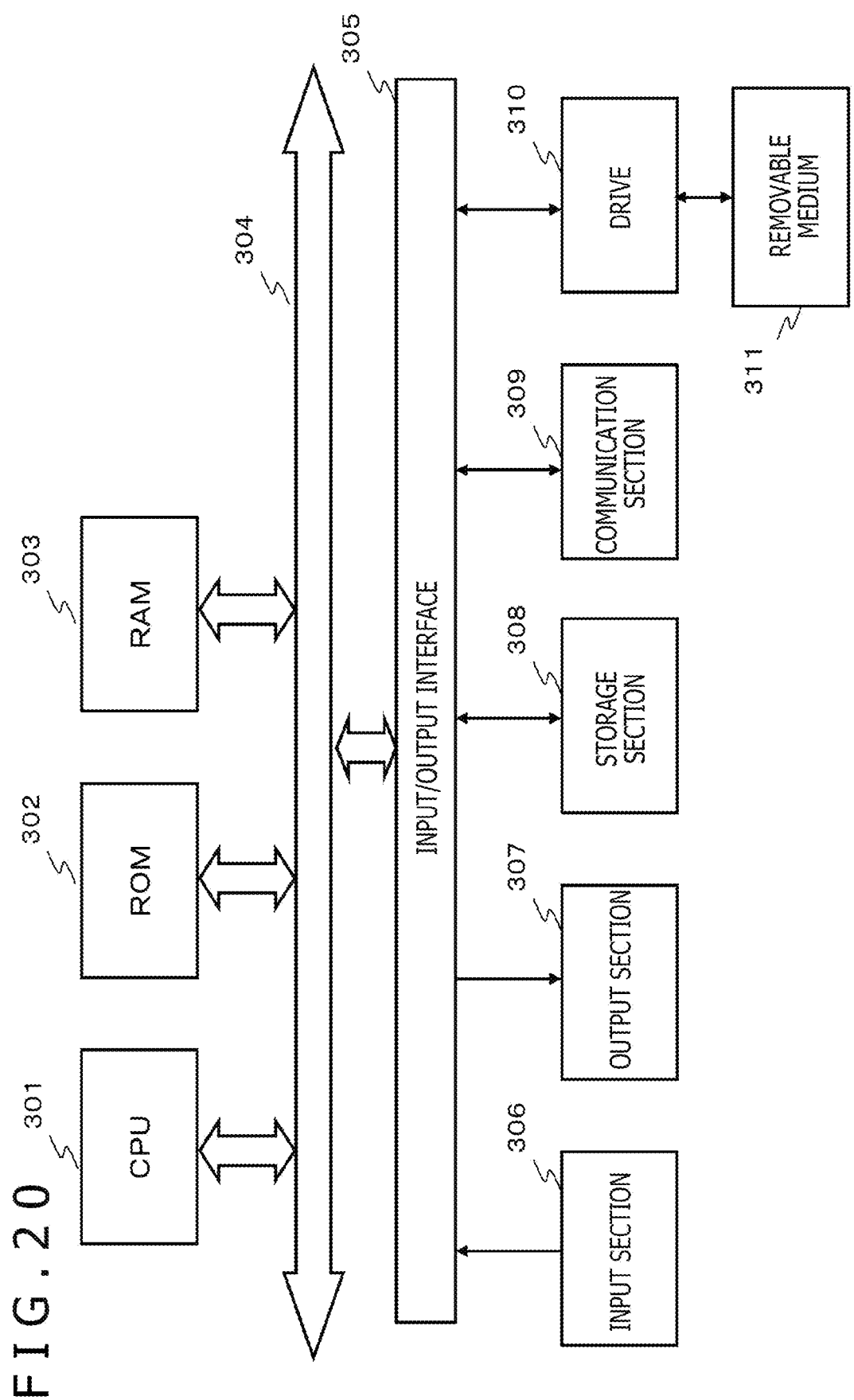

IMAGE PROCESSING APPARATUS AND IMAGE PROCESSING METHOD

CROSS REFERENCE TO RELATED APPLICATIONS

This application is a U.S. National Phase of International Patent Application No. PCT/JP2020/019019 filed on May 12, 2020, which claims priority benefit of Japanese Patent Application No. JP 2019-094285 filed in the Japan Patent Office on May 20, 2019. Each of the above-referenced applications is hereby incorporated herein by reference in its entirety.

TECHNICAL FIELD

The present disclosure relates to an image processing apparatus, an image processing method, and a program. More particularly, the disclosure relates to an image processing apparatus, an image processing method, and a program for correcting images projected by a projector.

BACKGROUND ART

In a case where images are projected on a screen with use of a projector and where the projector cannot be disposed directly in front of the screen, images may be projected rightward or leftward obliquely with respect to the screen. Images are distorted on the screen when thus projected obliquely. When a process of correcting the image distortion is carried out internally by the projector that performs image projection, the projector can display undistorted images.

An existing technology involving the process of image distortion correction as described above is disclosed in PTL 1 (PCT Patent Publication No. WO2017/104447), among others.

This literature discloses a configuration for performing a process of projected image correction in which a predetermined pattern image for calculating correction parameters is projected on a screen and in which the pattern image displayed on the screen is captured by a camera for analyzing the mode of distortion, the result of the analysis serving as the basis for carrying out the projected image correction process.

The configuration described in the above-cited literature requires, however, that the display of view-use images be halted to let a dedicated pattern image for correction parameter calculation be displayed for a predetermined period of time. That is, the display of view-use images must be interrupted while the pattern image is being displayed.

Thus, in a case where the display of a view-use image has started and where someone accidentally comes into contact with the projector causing the direction of projection to deviate and the projected image to be distorted, for example, it is necessary to perform processes of temporarily stopping the display of the view-use image, of causing the pattern image to be again displayed and captured by the camera, of using the captured pattern image as the basis for calculating new correction parameters, and of applying the calculated parameters to the image correction. While these processes are being carried out, the display of the view-use image has to be interrupted.

The interruption of the view-use image is bothersome for the viewer watching it.

CITATION LIST

Patent Literature

[PTL 1]
PCT Patent Publication No. WO2017/104447

SUMMARY

Technical Problem

The present disclosure has been made in view of the above circumstances. An object of the disclosure is therefore to provide an image processing apparatus, an image processing method, and a program capable of calculating parameters for correcting the distortion of an image projected by a projector and of correcting the distorted image with use of the calculated parameters without the presentation of a view-use image for a viewer being interrupted.

Solution to Problem

According to a first aspect of the present disclosure, there is provided an image processing apparatus including an image projection section configured to perform an image projection process based on a pulse width modulation (PWM) method, an output image control section configured to set a portion of a single-frame output period of a view-use image as a period in which to output a pattern image to be used for calculating an image correction parameter, a correction parameter calculation section configured to calculate the image correction parameter with use of the pattern image captured by a camera in the period in which to output the pattern image, and an image correction section configured to perform a correction process on the view-use image with use of the image correction parameter calculated by the correction parameter calculation section.

According to a second aspect of the present disclosure, there is provided an image processing method for execution by an image processing apparatus including an image projection section configured to perform an image projection process based on a pulse width modulation (PWM) method. The image processing method includes an output image control step of causing an output image control section to set a portion of a single-frame output period of a view-use image as a period in which to output a pattern image to be used for calculating an image correction parameter, a correction parameter calculation step of causing a correction parameter calculation section to calculate the image correction parameter with use of the pattern image captured by a camera in the period in which to output the pattern image, and an image correction step of causing an image correction section to perform a correction process on the view-use image with use of the image correction parameter calculated by the correction parameter calculation section.

According to a third aspect of the present disclosure, there is provided a program for causing an image processing apparatus to perform image processing, the image processing apparatus including an image projection section configured to perform an image projection process based on a pulse width modulation (PWM) method. The program includes an output image control step of causing the output image control section to set a portion of a single-frame output period of a view-use image as a period in which to output a pattern image to be used for calculating an image correction parameter, a correction parameter calculation step of causing a correction parameter calculation section to calculate the image correction parameter with use of the pattern image captured by a camera in the period in which to output the pattern image, and an image correction step of causing an image correction section to perform a correction process on the view-use image with use of the image correction parameter calculated by the correction parameter calculation section.

Incidentally, the program of the present disclosure can be offered via a storage medium or a communication medium in a computer-readable format to an information processing apparatus or a computer system capable of executing diverse program codes, for example. When supplied with such a program in a computer-readable manner, the information processing apparatus or the computer system performs the processes defined by the program.

Other objects, features and advantages of the present disclosure will become apparent by more detailed description based on some preferred embodiments of the present disclosure with reference to the appended drawings, which will be described later. In this description, the term "system" refers to a logical aggregate configuration of multiple apparatuses. The apparatuses in such a configuration may or may not be housed in a single enclosure.

One embodiment of the present disclosure provides an apparatus and a method to calculate correction parameters by capturing a pattern image and to correct images without interrupting the presentation of a view-use image projected by a projector.

Specifically, for example, the apparatus is configured to have an image projection section that performs an image projection process based on the pulse width modulation (PWM) method, an output image control section that sets a portion of a single-frame output period of a view-use image as a period in which to output a pattern image to be used for calculating an image correction parameter, a correction parameter calculation section that calculates the image correction parameter with use of the pattern image captured by a camera in the pattern image output period, and an image correction section that performs a correction process on the view-use image with use of the image correction parameter. For example, the output image control section controls the pattern image output period in such a manner that the pixel values of the pattern image fall within a range from a minimum pixel value to less than a minimum significant pixel value of the view-use image.

The above configuration thus provides an apparatus and a method to calculate correction parameters by capturing a pattern image and to correct images without interrupting the presentation of a view-use image projected by a projector.

It is to be noted that the advantageous effects stated in this description are only examples and not limitative of the present disclosure that may provide other advantages as well.

BRIEF DESCRIPTION OF DRAWINGS

FIG. 6 is another diagram explanatory of the image projection process based on the pulse width modulation (PWM) method.

FIGS. 7A and 7B are diagrams explanatory of examples of images projected by the image processing apparatus of the present disclosure.

FIGS. 8A, 8B, and 8C are diagrams explanatory of a pattern image display process and an execution sequence of a camera capture process, both processes being performed by the image processing apparatus of the present disclosure.

FIGS. 9A and 9B are another diagrams explanatory of the pattern image display process and the execution sequence of the camera capture process, both processes being performed by the image processing apparatus of the present disclosure.

FIGS. 11A, 11B, and 11C are diagrams explanatory of the embodiment capable of prolonging the camera capture time (exposure time).

FIGS. 12A, 12B, and 12C are diagrams explanatory of an embodiment capable of facilitating pattern detection and analysis.

FIGS. 13A, 13B, and 13C are diagrams explanatory of an embodiment that uses a rolling shutter camera as the camera for capturing a pattern image.

FIGS. 14A, 14B, and 14C are another diagrams explanatory of the embodiment that uses the rolling shutter camera as the camera for capturing the pattern image.

FIGS. 15A and 15B are diagrams explanatory of specific pattern image examples.

FIG. 16 is a diagram explanatory of other specific pattern image examples.

FIGS. 17A and 17B are diagrams explanatory of other specific pattern image examples.

FIG. 20 is a diagram explanatory of a hardware configuration example of the image processing apparatus of the present disclosure.

DESCRIPTION OF EMBODIMENTS

Figure 1:
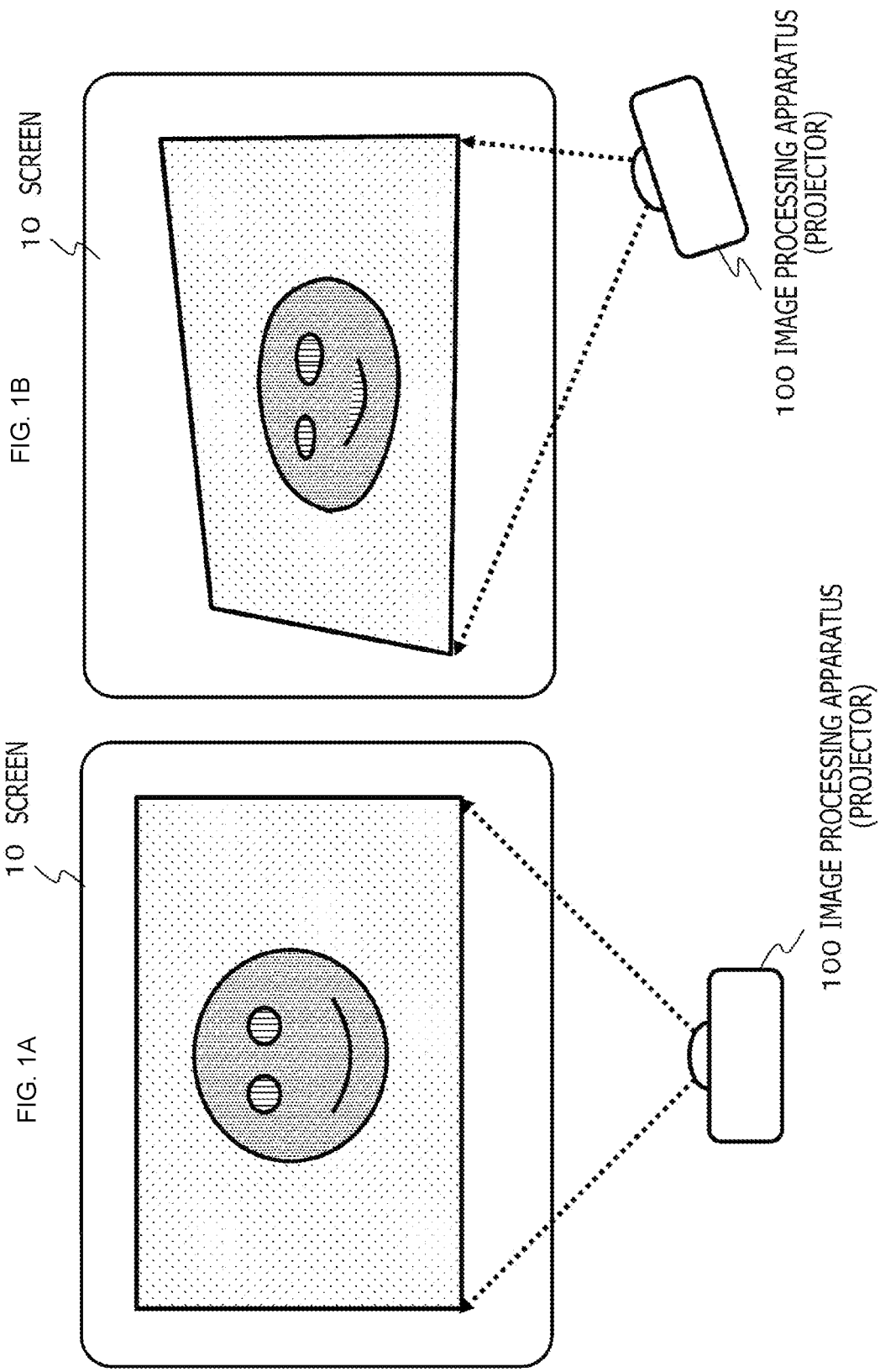
FIGS. 1A and 1B depict diagrams explanatory of the distortion of an image projected by an image processing apparatus (projector).

An image processing apparatus, an image processing method, and a program according to the present disclosure are described below in detail with reference to the accompanying drawings. The description is made under the following headings.

1. Distortion of images projected by projector and overview of process of distortion correction
2. Configuration example of image processing apparatus of present disclosure
3. Image projection process based on pulse width modulation (PWM) method
4. Details of pattern image projection and view-use image correction process performed by image processing apparatus of present disclosure
5. Other embodiments
  5-1. Embodiment capable of prolonging camera capture time (exposure time)

5-2. Embodiment capable of facilitating pattern detection and analysis 5-3. Embodiment using rolling shutter camera as camera for capturing pattern image 5-4. Other pattern image examples 6. Sequence of processes performed by image processing apparatus 7. Hardware configuration example of image processing apparatus 8. Summary of configurations of present disclosure

1. Distortion of Images Projected by Projector and Overview of Process of Distortion Correction Explained first with reference to FIGS. 1A and 1B and other drawings is the distortion of images projected by a projector, as well as an overview of the process of distortion correction.

FIGS. 1A and 1B depict examples of images projected by a projector as an example of the image processing apparatus of the present disclosure.

FIG. 1A depicts an example of an image projected and displayed on a screen 10 by an image processing apparatus (projector) 100 disposed directly in front of the screen 10.

In this case, the projected image is not distorted.

On the other hand, FIG. 1B depicts an example of an image projected obliquely with respect to the screen 10 by the image processing apparatus (projector) 100.

In this case, the projected image is distorted.

Such image distortion can be corrected by performing geometric correction such as keystone correction on the projected image.

That is, a correction process is performed internally by the image processing apparatus (projector) 100 on a projection image, so that a corrected and undistorted image can be projected and displayed on the screen 10.

Figure 2:
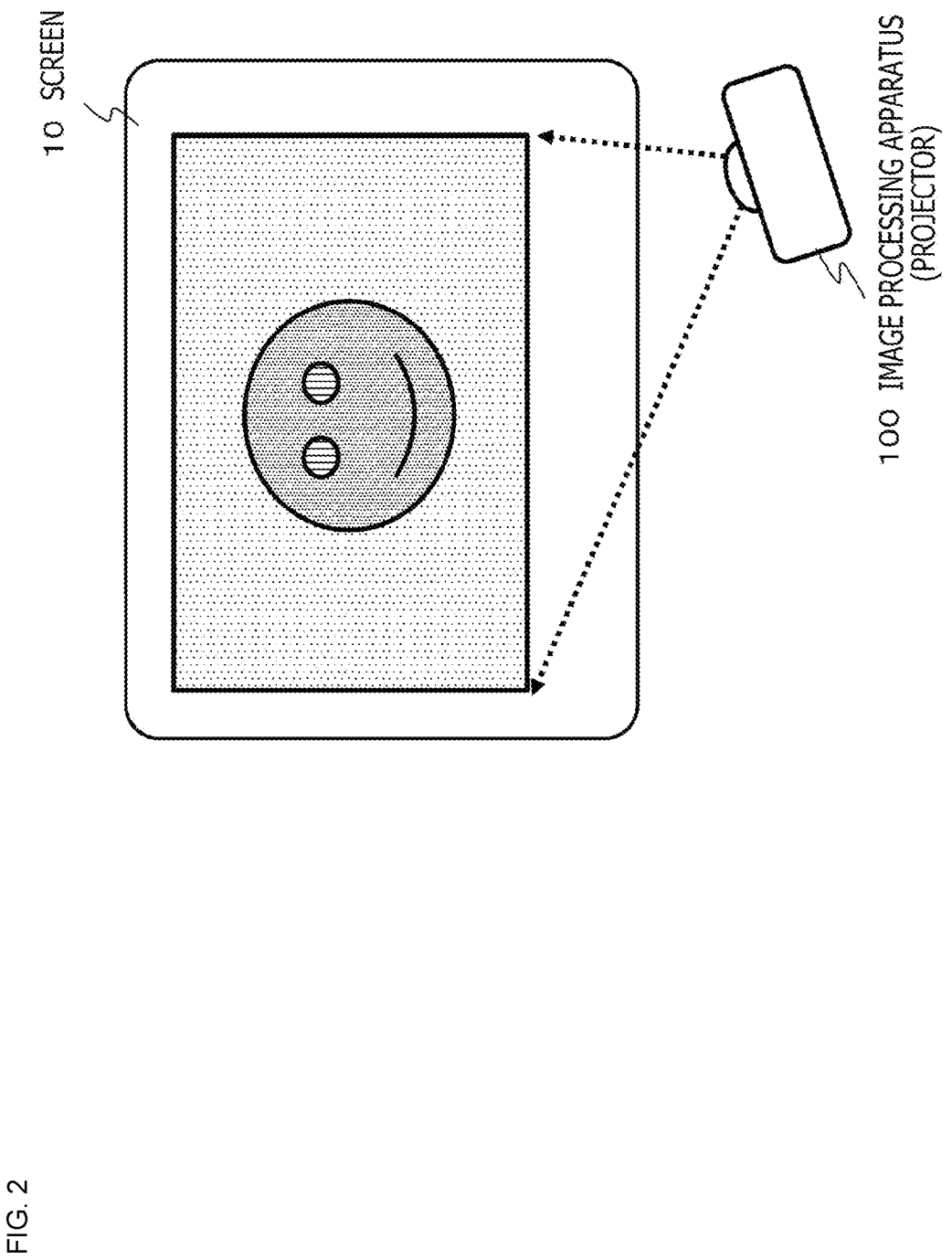
FIG. 2 is a diagram explanatory of an example of correcting the distortion of an image projected by an image processing apparatus (projector).

Specifically, as depicted in FIG. 2, the image is projected obliquely with respect to the screen 10 by the image processing apparatus (projector) 100 but the projected image is not distorted.

Although the correction process can be performed manually by a human operator operating the projector, the work involved is onerous and may well be difficult for an inexperienced user to carry out.

There is a known process in which a particular pattern image is projected, the projected pattern image is captured by a camera, and correction parameters are calculated from the captured pattern image for calculation of parameters for the image distortion correction.

Figure 3:
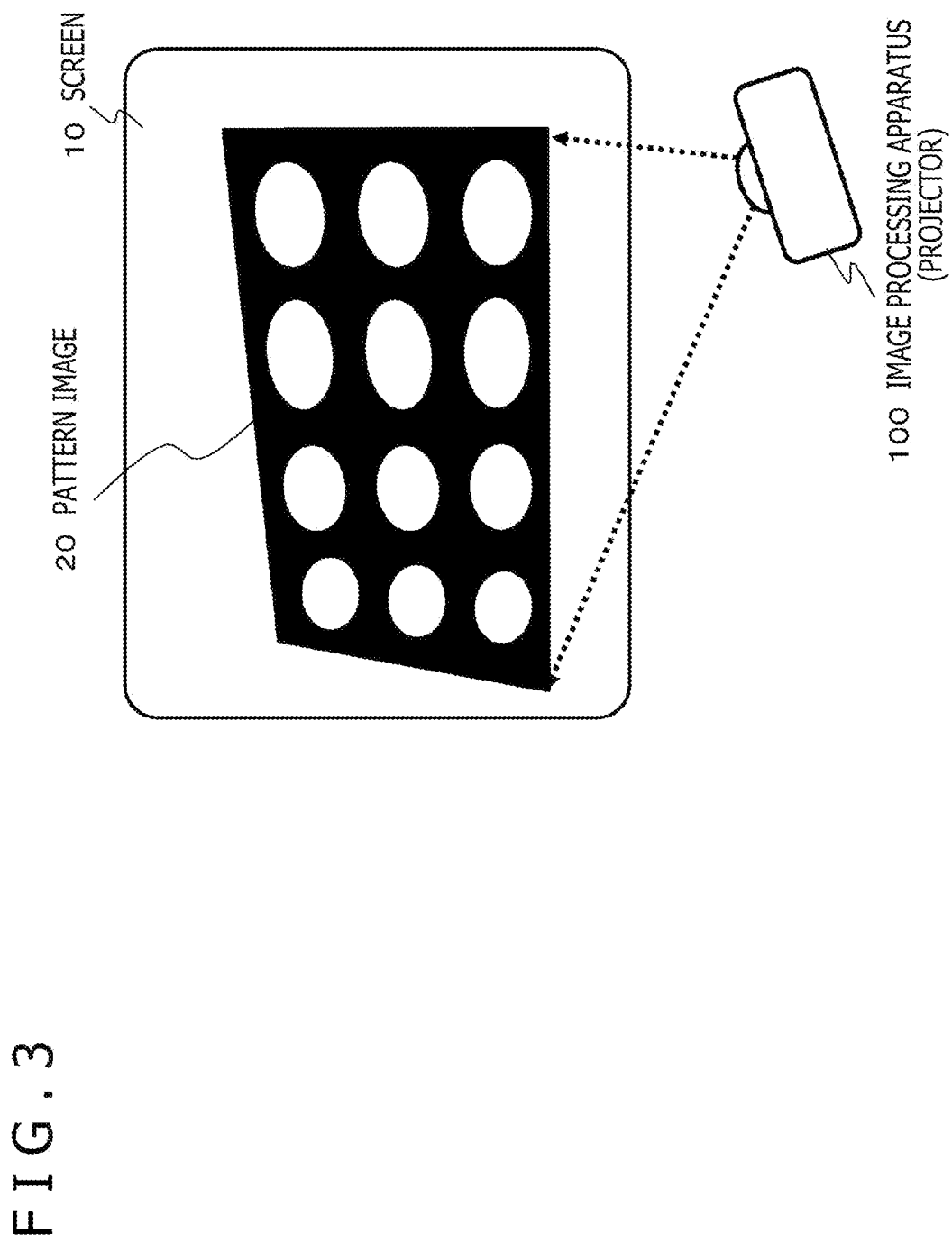
FIG. 3 is a diagram explanatory of a pattern image example for calculating correction parameters.

For example, a pattern image 20 such as one in FIG. 3 can be displayed, the displayed pattern image can be captured by a camera, and the captured image can be analyzed to calculate the parameters necessary for distortion correction (i.e., correction parameters).

Incidentally, such a correction parameter calculation process involving projection of the pattern image is a known technology disclosed in the above-cited PTL 1 (PCT Patent Publication No. WO2017/104447), among others.

However, as described above, the configuration described in PTL 1 involves performing the process of obtaining correction parameters by having to stop the display of the view-use image to display the pattern image.

That is, while the pattern image is being displayed, the display of view-use images must be halted.

Thus, in the case where the display of a view-use image has started and where someone accidentally comes into contact with the projector causing the direction of projection to deviate and the projected image to be distorted, for example, it is necessary to perform the processes of temporarily stopping the display of the view-use image, of causing the pattern image to be again displayed and captured by the camera, of using the captured pattern image as the basis for calculating new correction parameters, and of applying the calculated parameters to the image correction. While these processes are being carried out, the display of the view-use image has to be interrupted.

Such interruption of the view-use image is bothersome for the viewer watching it.

The present disclosure makes it possible to calculate parameters for correcting the distortion of images projected by a projector and to correct the distorted images with use of the calculated parameters without the presentation of a view-use image for the viewer being interrupted.

2. Configuration Example of Image Processing Apparatus of Present Disclosure A configuration example of the image processing apparatus of the present disclosure is explained next.

Figure 4:
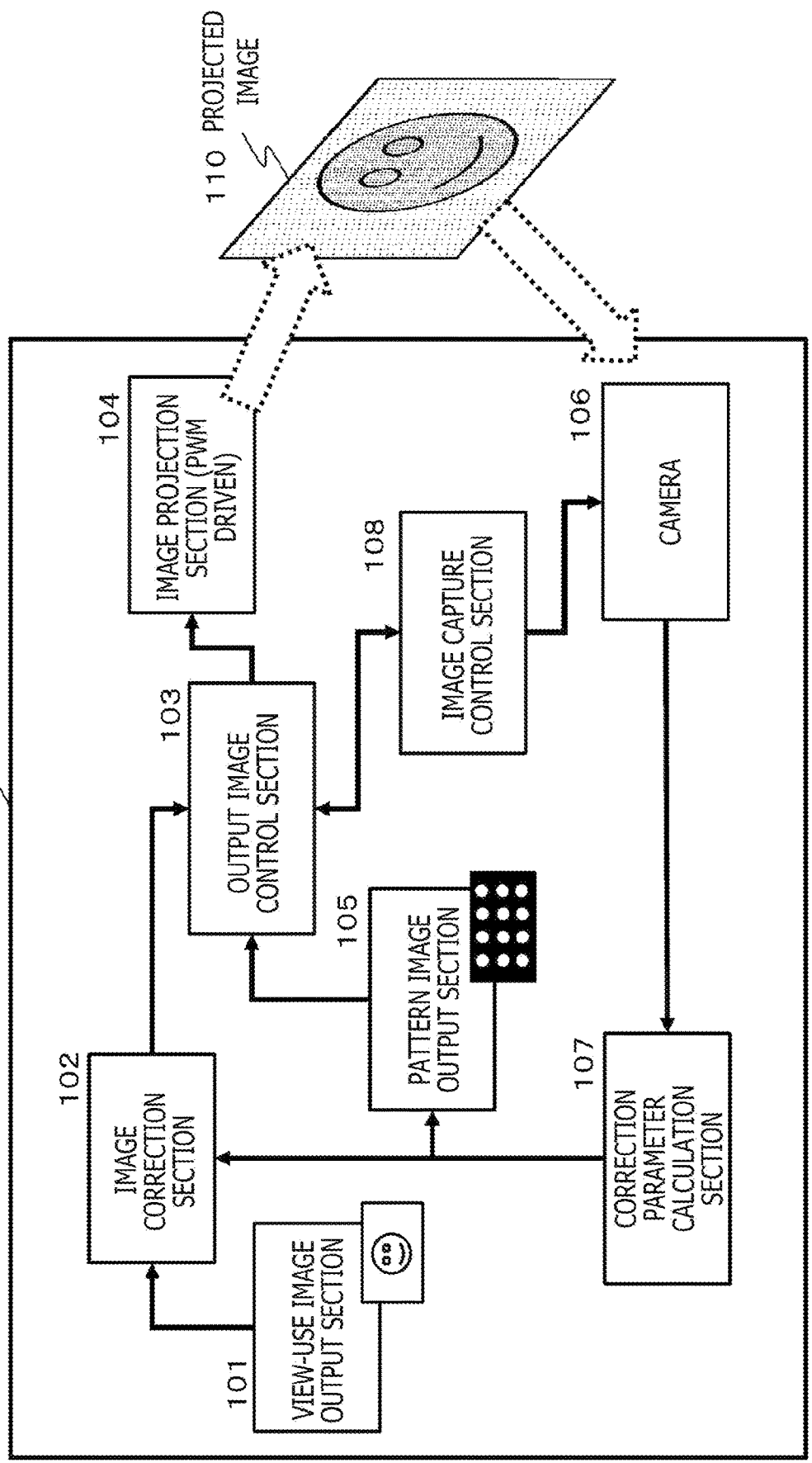
FIG. 4 is a diagram explanatory of a configuration example of an image processing apparatus of the present disclosure.

FIG. 4 is a diagram explanatory of a configuration example of the image processing apparatus (projector) 100 of the present disclosure.

As depicted in FIG. 4, the image processing apparatus 100 has a view-use image output section 101, an image correction section 102, an output image control section 103, an image projection section 104, a pattern image output section 105, a camera 106, a correction parameter calculation section 107, and an image capture control section 108.

The view-use image output section 101 outputs view-use images such as the images of a movie. It is to be noted that the view-use images can also be those stored in a storage section, not depicted, or video data such as those of movies input from an external reproduction apparatus or from an external server via a communication section, for example.

The image correction section 102 performs a correction process on the images input from the view-use image output section 101. That is, the image correction section 102 carries out the correction process such as geometric correction for enabling distortion-free image display.

The image correction section 102 performs an image correction process for enabling projection of an undistorted image such as one explained with reference to FIG. 2. It is to be noted that the correction parameters for use in this correction process are input from the correction parameter calculation section 107.

The output image control section 103 selects either a view-use image corrected by the image correction section 102 or a pattern image output from the pattern image output section 105, and outputs the selected image to the image projection section 104.

The image projection section 104 projects either the corrected view-use image or the pattern image selected by the output image control section 103.

For example, a projected image 110 depicted in the drawing is displayed on the screen.

It is to be noted that the image projection section 104 performs image projection based on the pulse width modulation (PWM) method.

The PWM method is an image output method by which the output time of each pixel is controlled in units of frames making up videos so as to express luminance and a color of each pixel.

It is to be noted that the PWM method will be discussed later in more detail.

The pattern image output section 105 outputs, to the output image control section 103, the pattern image for calculating the correction parameters for use in correcting the distorted view-use image. A pattern image is, for example, the pattern image 20 explained above with reference to FIG. 3.

The camera 106 captures an image at the time when the pattern image is projected via the image projection section 104.

The image capture control section 108 performs timing control of the image capture.

The projected pattern image captured by the camera 106 is output to the correction parameter calculation section 107.

The correction parameter calculation section 107 analyzes the projected pattern image captured by the camera 106 so as to calculate the parameters necessary for distortion correction (i.e., correction parameters).

It is to be noted that this process of correction parameter calculation is a known process described in the above-cited PTL 1 (PCT Patent Publication No. WO2017/104447), among others, and thus will not be discussed further in detail.

The image capture control section 108 controls the timing for the camera 106 to capture the projected image.

The image capture control section 108 receives input of pattern image output timing information from the output image control section 103 and causes the camera 106 to capture the image according to the input timing. This process allows the camera 106 to capture the projected pattern image.

3. Image Projection Process Based on Pulse Width Modulation (PWM) Method

Explained next is the image projection process based on the pulse width modulation (PWM) method.

As described above, the image projection section 104 of the image processing apparatus (projector) 100 depicted in FIG. 4 performs image projection based on the pulse width modulation (PWM) method.

The PWM method is an image output method by which the output time of each pixel is controlled in units of frames making up videos so as to express luminance and a color of each pixel.

The image projection process based on the PWM method is explained below in detail with reference to FIGS. 5A and 5B and other drawings.

Figure 5:
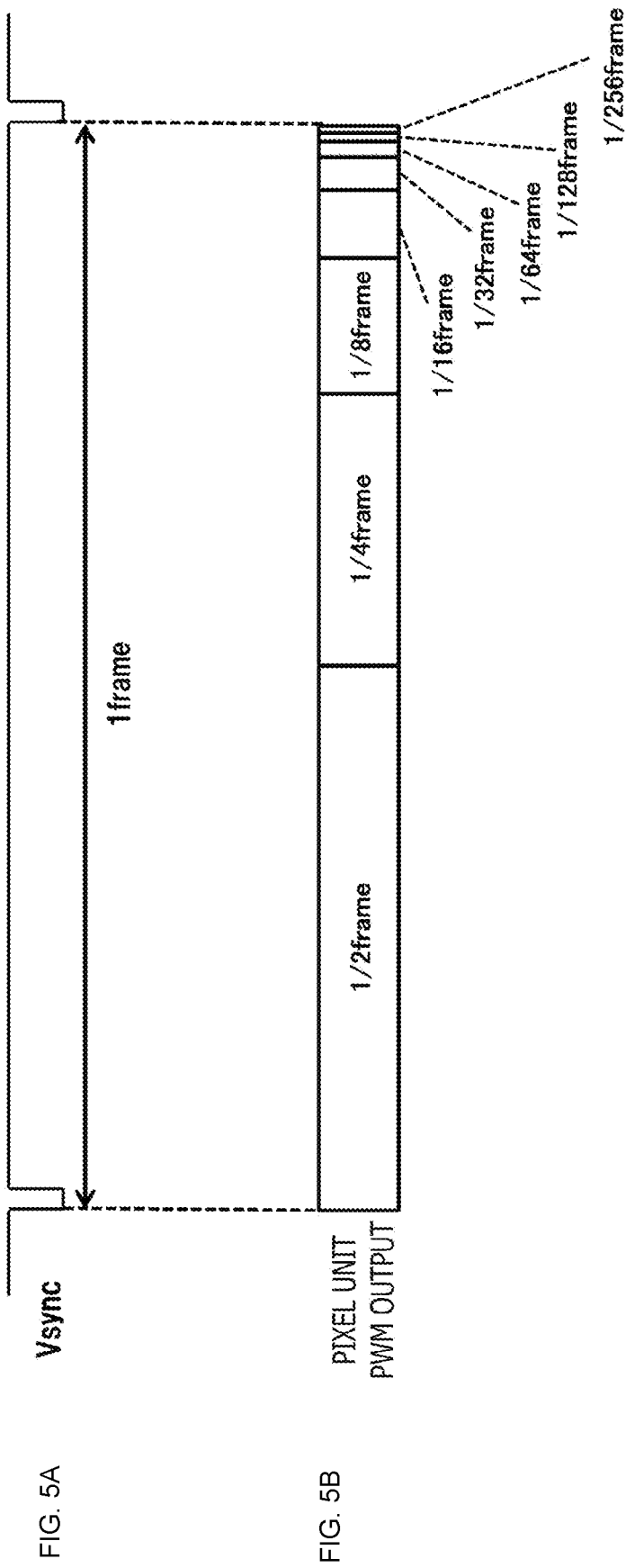
FIGS. 5A and 5B are diagrams explanatory of an image projection process based on a pulse width modulation (PWM) method.

FIGS. 5A and 5B depict the data of the following.

FIG. 5A Vertical synchronization signal (Vsync), and

FIG. 5B Pixel unit PWM output.

FIG. 5A The interval between two pulses of the vertical synchronization signal (Vsync) corresponds to the output period of one frame of an image.

FIG. 5B The pixel unit PWM output is explanatory of the mode of output control in units of a pixel of the projected image.

It is assumed that an 8-bit signal is assigned as a luminance value of each pixel for the view-use image. In this case, the luminance value of each pixel is expressed in 256 gradations from 0 to 255.

It is assumed that a pixel of maximum luminance (255) is output (illuminated) during the entire period of one frame (ON).

It is assumed that a pixel of minimum luminance (0) is not output (illuminated) during the entire period of one frame (OFF).

It is further assumed that a pixel of intermediate luminance (128) is output (illuminated) during the first half of one frame period (ON). In the drawing, this pixel is assumed to be output (illuminated) over ½ frame (ON).

It is also assumed that a pixel of ¼ luminance (64) is output (illuminated) during one quarter of one frame period (ON). In the drawing, this pixel is assumed to be output (illuminated) over ¼ frame (ON).

As described above, the output (illumination) period of each pixel is controlled during each frame period in a manner reflecting the luminance value (0 to 255). This makes it possible to express the luminance value of each pixel in gradations from 0 to 255. That is, a gray-scale image can be displayed as the projected image.

FIG. 6 is a diagram depicting an example of output (illumination) period control corresponding to gradations from 0 to 255.

When the output (illumination) period in each frame period is controlled in units of a pixel as described above, it is possible to control the luminance value of each pixel.

In such a manner, the image projection section 104 of the image processing apparatus 100 of the present disclosure performs image projection based on the pulse width modulation (PWM) method.

This process thus permits gray-scale image projection.

Incidentally, each output of RGB can be controlled in like manner. When each output of RGB is put to the image projection based on the pulse width modulation (PWM) method, color images can be output.

The image projection section 104 of the image processing apparatus 100 of the present disclosure is also capable of projecting color images based on the pulse width modulation (PWM) method.

4. Details of Pattern Image Projection and View-Use Image Correction Process Performed by Image Processing Apparatus of Present Disclosure Explained next are the details of pattern image projection and the view-use image correction process performed by the image processing apparatus of the present disclosure.

As described above, the image processing apparatus 100 of the present disclosure is capable of calculating correction parameters based on the pattern image and thereby correcting the view-use image without interrupting the presentation of the view-use image to the viewer.

The pattern image projection and the view-use image correction process carried out by the image processing apparatus of the present disclosure are described below in detail.

FIGS. 7A and 7B depict examples of images projected by the image processing apparatus 100 of the present disclosure.

FIGS. 7A and 7B illustrate examples of the following images.

FIG. 7A View-use image, and

FIG. 7B Pattern image.

FIG. 7A The view-use image is the image of a movie to be viewed, for example.

FIG. 7B The pattern image is an image projected to calculate the correction parameters for use in the correction process for displaying an undistorted normal view-use image.

In FIGS. 7A and 7B, "FIG. 7B PATTERN IMAGE" is one example of the pattern image. In "FIG. 7B PATTERN IMAGE" depicted in the drawing, dots are arranged in a grid-like pattern, i.e., the dots are arranged at points of intersection of the grid formed by horizontal and vertical lines to form the pattern image. It is to be noted that such a pattern image is not limitative of the pattern images for correction parameter calculation. Diverse images may be utilized alternatively for the purpose.

Incidentally, multiple specific examples of the alternative pattern images will be discussed later.

For example, the image processing apparatus (projector) 100 of the present disclosure projects the pattern image with its dots arranged at points of intersection of the grid formed by horizontal and vertical lines as depicted, and has the projected pattern image captured by the camera 106.

In a case where the image processing apparatus (projector) 100 is not disposed directly in front of the screen, the dots of the pattern image captured by the camera are displayed in a manner deviating from the intersection points of the grid formed by the horizontal and vertical lines.

The correction parameter calculation section 107 analyzes the arrangement of the dots in the pattern image captured by the camera 106, etc. The analysis makes it possible, for example, to analyze the positions in which the pixels constituting the projected image are displayed on the screen. The result of the analysis is used to calculate the parameters for correcting the distortion of the image displayed on the screen.

The correction parameters calculated by the correction parameter calculation section 107 are input to the image correction section 102. Using the correction parameters, the image correction section 102 performs a correction process such as geometric transform on the view-use image. The correction process enables the view-use image to be projected as an undistorted image as in the case where the image processing apparatus (projector) 100 is disposed directly in front of the screen.

The image processing apparatus 100 of the present disclosure performs the following series of processes without interrupting the presentation of the view-use image to the viewer.

(a) Pattern image display process,
(b) Pattern image camera capture process,
(c) Correction parameter calculation process, and
(d) View-use image correction process.

Explained below with reference to FIGS. 8A, 8B, and 8C are the execution sequence of the pattern image display process and that of the camera capture process performed by the image processing apparatus 100 of the present disclosure.

FIGS. 8A, 8B, and 8C depict the following data as time-series data.

FIG. 8A Vertical synchronization signal (Vsync),
FIG. 8B Image output period, and
FIG. 8C Capture timing.

The interval between two pulses of the vertical synchronization signal (Vsync) of FIG. 8A above corresponds to a single-frame output period of an image.

A time tx-ty is assumed to be the single-frame output period of the image.

In the single-frame output period of the image over the time tx-ty, two images, i.e., the pattern image and the view-use image, are output (projected) in a time-division manner.

As indicated by the image output period of FIG. 8B above in the drawing, a time tx-t1 is set as a pattern image output period and a subsequent time t1-ty as a view-use image display period.

The control of this display switchover is executed by the output image control section 103 of the image processing apparatus 100 depicted in FIG. 4.

Incidentally, the pattern image output period (tx-ty) is depicted elongated in the drawing for the purpose of simplified explanation. For example, that period can be as short as one-several-hundredths of the single-frame output period (tx-ty), specifically, 1/300 or thereabout of the single-frame output period, for example.

The capture timing of FIG. 8C above is the timing for the camera 106 to capture the projected image. The capture timing is set within the time tx-t1. Whereas the capture timing of FIG. 8C above in the drawing is depicted to span the entire period over the time tx-t1, the projected image need only be captured at a given point in that period.

The control of the image capture timing is executed by the image capture control section 108.

As discussed above with reference to FIG. 4, the image capture control section 108 receives input of the pattern image output timing information from the output image control section 103, and causes the camera 106 to perform image capture according to the input timing. This process enables the camera 106 to capture the projected pattern image.

Incidentally, in a case where a global shutter camera capable of exposing all pixels at the same time is used as the camera 106, the image capture control section 108 controls the capture start timing of the camera 106 in such a manner that the capture is completed between the pattern image display start time (tx) and the pattern image display end time (t1).

In such a manner, the image processing apparatus 100 of the present disclosure sequentially displays the following two images in the single-frame display period.

(a) Pattern image (display period: tx-t1), and
(b) View-use image (display period: t1-ty).

The viewer observes these two images being displayed in sequence.

If the period of pattern image display is long, the viewer will notice the pattern image.

However, the output image control section 103 of the image processing apparatus 100 of the present disclosure controls the pattern image output period (tx-t1) to be a very short time of 1/300 or thereabout of the single-frame output period (tx-ty), for example.

That is, as depicted in FIGS. 9A and 9B, if the view-use image is an image having 8-bit (0 to 255) pixel values set therein, for example, the pattern image output period (tx-t1) is set to be 1/256 or less of the single-frame output period (tx-ty).

As described above, the output image control section 103 controls the pattern image output period in such a manner that the pixel values of the pixels constituting the pattern image fall within a range between a minimum pixel value (0) and less than a minimum significant pixel value (1) of the view-use image.

Given the above settings, the pattern image displayed during this period becomes an image constituted by the pixel values not higher than the minimum significant image value (1) of the normal image. There is thus a very low possibility of the pattern image being noticed by the viewer. That is, the pattern image becomes a virtually invisible image that is not perceived by the viewer.

The pattern image projected and displayed in the time tx-t1 is captured by the camera 106. The projected pattern image thus captured is output to the correction parameter calculation section 107.

The correction parameter calculation section 107 analyzes the projected pattern image captured by the camera 106 and calculates accordingly the parameters necessary for distortion correction (i.e., correction parameters).

The correction parameters calculated by the correction parameter calculation section 107 are input to the image correction section 102.

The image correction section 102 performs the correction process on the image input from the view-use image output section 101 by use of the correction parameters calculated by the correction parameter calculation section 107. That is, the image correction section 102 carries out the correction process such as geometric transform to turn the projection image into an undistorted normal image.

The image having undergone the correction process is projected from the image projection section 104 via the output image control section 103.

The above series of processes implements the processing with no need for stopping the display of the view-use image. That is, the image processing apparatus 100 of the present disclosure is capable of carrying out the following series of processing without interrupting the presentation of the view-use image to the viewer.

(a) Pattern image display process, (b) Pattern image camera capture process, (c) Correction parameter calculation process, and (d) View-use image correction process.

Incidentally, the frames in which to display the pattern image may be either the entirety or a portion of the frames for displaying the view-use image. For example, only one frame for every tens of seconds to several minutes may be set as the pattern image display frame, with no other frame used for the pattern image display. The remaining frames may be used to display solely the normal view-use images.

5. Other Embodiments

Other embodiments of the present disclosure are explained below.

5-1. Embodiment Capable of Prolonging Camera Capture Time (Exposure Time)

Explained first is an embodiment capable of prolonging the camera capture time (exposure time).

As discussed earlier with reference to FIGS. 9A and 9B, the preceding embodiment has the pattern image output period (tx-t1) set to be shorter than 1/256 of the single-frame output period (tx-ty), for example.

This period of time may or may not be sufficiently long for the camera to capture an image.

The embodiment to be discussed below is configured to solve this problem and is capable of prolonging the camera capture time (exposure time).

This embodiment is explained with reference to FIG. 10 and other drawings.

Figure 10:
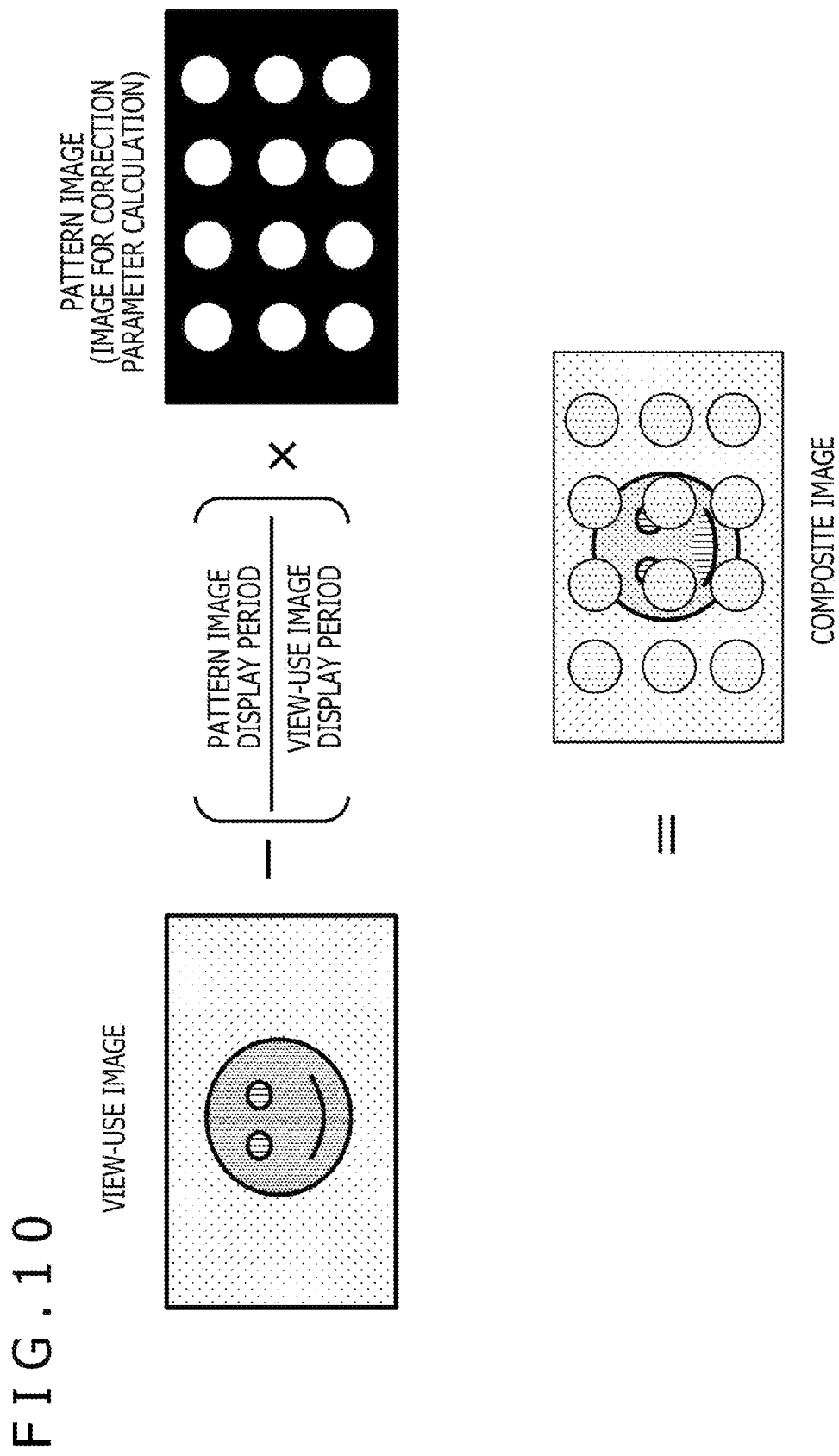
FIG. 10 is a diagram explanatory of an embodiment capable of prolonging a camera capture time (exposure time).

FIG. 10 explains a process of generating a composite image to be displayed in an image display period other than the pattern image display period during the single-frame display period (tx-ty).

As depicted in FIG. 10, the composite image is generated according to the following formula (Formula 1).

$$\text{Composite image} = \text{(view-use image)} - (((\text{pattern image display period}/\text{view-use image display period})) \times (\text{pattern image})))$$ (Formula 1)

The view-use image display period is a single-frame display period.

The pattern image display period is a pattern image display period set within the single-frame period.

The composite image calculated according to the Formula 1 above is an image generated by extracting, from the view-use image, the value acquired by having the pattern image multiplied by the ratio between the single-frame image display period and the pattern display period.

It is to be noted that, as with the view-use image, the pattern image is assumed to be an image expressed in gradations from 0 to 255, for example.

When the pattern image and the composite image calculated as per the Formula 1 above are consecutively projected in the single-frame display period (tx-ty) of the image, the luminance values contributed by the pattern image are cancelled as the integrated luminance values within the frame and are thus made invisible.

That is, the composite image is set in such a manner that the integrated pixel values of the pattern image and of the composite image output in the single-frame output period of the view-use image are made approximately equal to the pixel values of the view-use image.

A specific example of what has been described above is explained with reference to FIGS. 11A, 11B, and 11C.

As explained above with reference to FIGS. 8A, 8B, and 8C, FIGS. 11A, 11B, and 11C depict the following data as time-series data.

FIG. 11A Vertical synchronization signal (Vsync),

FIG. 11B Image output period, and

FIG. 11C Capture timing.

The interval between two pulses of the vertical synchronization signal (Vsync) of FIG. 11A above corresponds to the single-frame output period of the image.

The time tx-ty is assumed to be the single-frame output period of the image.

In the single-frame output period of the image over the time tx-ty, two images, i.e., the pattern image and the composite image generated according to the calculation formula explained with reference to FIG. 10 are output (projected) in a time-division manner.

As indicated by the image output period of FIG. 11B above in the drawing, a time tx-t2 is set as the pattern image output period and a subsequent time t2-ty as a composite image display period.

The control of this display switchover is executed by the output image control section 103 of the image processing apparatus 100 depicted in FIG. 4.

When the two images are switched within the single-frame period to display either image, the image to be observed by the viewer, i.e., a visually recognized image becomes approximately the same as the view-use image as illustrated. It is to be noted that the visually recognized image corresponds to an image calculated according to the following calculation formula (Formula 2).

Visually recognized image = (Formula 2)

(pattern image) × ((pattern image display period)/

(view-use image display period)) +

(composite image) × (((view-use image display period) − (pattern image display period))/

(view-use image display period)))

When the composite image is generated and displayed in such a manner, it is possible to set the pattern image display period (tx-t2) in a variable manner. That is, the pattern image display period can be set to be long, which permits prolongation of the camera capture time.

The capture timing of FIG. 11C above is the timing for the camera 106 to capture the projected image. The capture timing is set within the time tx-t2. Whereas the capture timing of FIG. 11C above is depicted in the drawing to span the entire period over the time tx-t2, the projected image need only be captured at a given point in that period.

The control of the image capture timing is executed by the image capture control section 108.

This embodiment generates a composite image calculated according to the Formula 1 explained above with reference to FIG. 10, and switches the pattern image and the composite image in the single-frame display period. This makes it possible to set the pattern image display period (tx-t2) in a variable manner. That is, the pattern image display period may be set to be long, which allows the camera capture time to be prolonged.

5-2. Embodiment Capable of Facilitating Pattern Detection and Analysis

Explained next is an embodiment capable of facilitating detection and analysis of the projected pattern image.

The camera 106 of the image processing apparatus 100 depicted in FIG. 4 captures the image in the period of pattern image projection.

However, the image captured by the camera 106 may include images surrounding the projected pattern image. For example, the screen and diverse objects around the screen are included in the captured image.

Given the captured image including such diverse objects, the correction parameter calculation section 107 is required first to perform signal processing to remove the images unrelated to the pattern from the analysis target image.

The wider the area of those analysis non-targeted image regions other than the pattern image which are included in the captured image, the longer it takes to perform the signal processing.

The embodiment to be described below is configured to easily remove the analysis non-targeted image regions.

Incidentally, it is the correction parameter calculation section 107 that performs the process of removing the analysis non-targeted image regions and a subsequent process of calculating correction parameters through pattern analysis.

A specific example of the processing by this embodiment is explained below with reference to FIGS. 12A, 12B, and 12C.

FIGS. 12A, 12B, and 12C depict the following data as time-series data.

FIG. 12A Vertical synchronization signal (Vsync),

FIG. 12B Image output period, and

FIG. 12C Capture timing.

The interval between two pulses of the vertical synchronization signal (Vsync) of FIG. 12A above corresponds to a single-frame output period of the image.

A time tx-ty is assumed to be the single-frame output period of the image.

FIGS. 12A, 12B, and 12C indicate the output periods of two consecutive frames (tx-ty and ty-tz).

First, a pattern image "a" is initially output in a preceding single-frame output period (tx-ty) of the image. Then, a pattern image "b" is output in a subsequent single-frame output period (ty-tz) of the image.

The pattern image "b" is a reverse image of the other pattern image.

The camera 106 captures an image in the pattern image output period of each frame.

As a result, captured images "a" and "b" depicted in the lower part of FIGS. 12A, 12B, and 12C are acquired.

Each captured image includes not only the pattern image but also diverse objects in the surroundings.

The correction parameter calculation section 107 receives input of the captured images "a" and "b" corresponding to two consecutive frames.

Given the captured images "a" and "b" corresponding to two consecutive frames, the correction parameter calculation section 107 calculates an analysis-use image, according to the following formula (Formula 3).

Analysis-use image = (Formula 3)

(captured image "a") − (captured image "b")

The Formula 3 above involves calculating the difference between the captured image "a" and the captured image "b" to obtain a difference image for use as the analysis-use image.

This difference calculation process cancels all the same pixel values included in the captured images "a" and "b."

That is, motionless subjects are excluded from the difference image (analysis-use image). Solely the pattern in the pattern image remains.

Using the analysis-use image, the correction parameter calculation section 107 performs the process of calculating the correction parameters for use in distortion correction.

Performing the above process makes it possible to shorten the time it takes to detect and remove those analysis non-targeted image regions other than the pattern image which are included in the captured image. This achieves an increase in processing speed.

5-3. Embodiment Using Rolling Shutter Camera as Camera for Capturing Pattern Image Explained next is an embodiment that uses a rolling shutter camera as the camera for capturing the pattern image.

The embodiment to be described below is one in which a rolling shutter camera is used as the camera 106 of the image processing apparatus 100 depicted in FIG. 4.

The rolling shutter camera is configured to perform exposure successively from the top line down of a camera-captured image. The exposure timing varies depending on the vertical position of each captured pixel.

The processing performed by this embodiment is explained below with reference to FIGS. 13A, 13B, and 13C.

FIGS. 13A, 13B, and 13C depict the following data as time-series data.

FIG. 13A Vertical synchronization signal (Vsync),

FIG. 13B Image output period, and

FIG. 13C Capture timing.

The interval between two pulses of the vertical synchronization signal (Vsync) of FIG. 13A above corresponds to a single-frame output period of the image.

A time tx-ty is assumed to be the single-frame output period of the image.

In the single-frame output period of the image over the time tx-ty, two images, i.e., the pattern image and the view-use image, are output (projected) in a time-division manner.

As indicated by the image output period of FIG. 13B above, a time tx-t1 is set as a pattern image output period and a subsequent time t1-ty as a view-use image display period.

The control of this display switchover is executed by the output image control section 103 of the image processing apparatus 100 depicted in FIG. 4.

The capture timing of FIG. 13C above is the timing for the camera 106 to capture the projected image. In this embodiment, the camera 106 is a rolling shutter camera. The camera 106 is configured to perform exposure successively from the top line down of the image. The exposure timing varies depending on the vertical position of each captured pixel.

As a result, the camera-captured image becomes an image such as one illustrated in the drawing. The pattern image is captured of only the middle region where the exposure period coincides with the pattern image display period over the time tx-t1. In the upper region and the lower region excluding the middle region, the view-use image is captured without the pattern image being captured.

In the case where the rolling shutter camera is used in such a manner, it might become difficult to capture a complete pattern image within the very shot pattern image display period.

However, although it is difficult to capture (expose) the pattern image as a whole in a single capture operation, it is possible, as depicted in FIG. 14, for example, to generate an analysis-use image that includes the entire pattern image by executing the process of pattern image capture in consecutive frames at different times and by combining these multiple captured images into the analysis-use image.

Incidentally, the capture start timing in each frame is controlled by the image capture control section 108 acquiring the pattern image output timing information from the output image control section 103.

The correction parameter calculation section 107 combines multiple captured images depicted in FIGS. 14A, 14B, and 14C into the analysis-use image, and performs the process of correction parameter calculation with use of the analysis-use image thus generated.

5-4. Other Pattern Image Examples

For the above-described embodiments, it has been explained that the pattern image for calculating the correction parameters uses the pattern image with its dots arranged in a grid-like pattern, i.e., dots arranged at the points of intersection of the grid formed by horizontal and vertical lines.

As described above, the pattern image for correction parameter calculation is not limited to such a pattern image and may be any one of diverse images.

Some other examples of the pattern image are explained below with reference to FIGS. 15A and 15B and other drawings.

A pattern image example 1 of FIG. 15A is a pattern image having marks arranged in the four corners of the image.

In a case where the deformation (distortion) of the image is a pattern that can be represented by affine transform, finding the positions of the four corners in the image enables correction of the deformation. The pattern image given as the pattern image example 1 of FIG. 15A can then be utilized for the correction.

The pattern image indicated as the pattern image example 1 has a small number of detection points and thus does not impose heavy processing load.

A pattern image example 2 of FIG. 15B is a pattern image having two rectangular (quadrangular) regions, i.e., a peripheral region and an inner region of the pattern image. This pattern image is intended for detection of the four sides making up the rectangle (quadrangle). This is a pattern image example effective for a case of performing the correction in a manner aligning the image with the screen edges, for example.

Pattern image examples 3 of FIG. 16 involve multiple pattern images having a different dot density each.

A pattern image example 3a is constituted by dots of low density, and a pattern image example 3b is formed by dots of high dot density.

For example, in a case where a deformed region of the projected image constitutes a deformation of the entire image, i.e., a global deformation, the pattern image of the pattern image example 3a with dots of low density is used to calculate the correction parameters addressing the image as a whole.

On the other hand, in a case where the deformed region of the projected image is a deformation of a portion of the image, i.e., a local deformation, the pattern image of the pattern image example 3b with dots of high intensity is used to calculate the correction parameters addressing the partial image region.

A pattern image example 4 of FIG. 17A is a pattern image having dots of different luminance levels or different colors.

Using the pattern image with dots of different luminance levels or different colors in such a manner makes it possible easily to determine the positional relation between the dots and to thereby execute the correction parameter calculation process efficiently.

A pattern image example 5 of FIG. 17B is a pattern image having dots of different shapes.

As with the pattern image example 4 of FIG. 17A above, the pattern image with dots of different shapes in such a manner permits easy determination of the positional relation between the dots, which enables efficient execution of the correction parameter calculation process.

Incidentally, in a case where the rolling shutter camera explained above with reference to FIGS. 13A, 13B, 13C, 14A, 14B, and 14C are used, it may be necessary to perform the process of combining multiple captured pattern images. In this case, a pattern image that permits easy identification of the positional relation between the dots such as the pattern image example 4 or 5 depicted in FIGS. 17A and 17B may be utilized. This makes it possible to perform the process of combining multiple images unfailingly in a highly precise manner over a short amount of time.

6. Sequence of Processes Performed by Image Processing Apparatus

Explained next is the sequence of the processes performed by the image processing apparatus 100 of the present disclosure.

Figure 18:
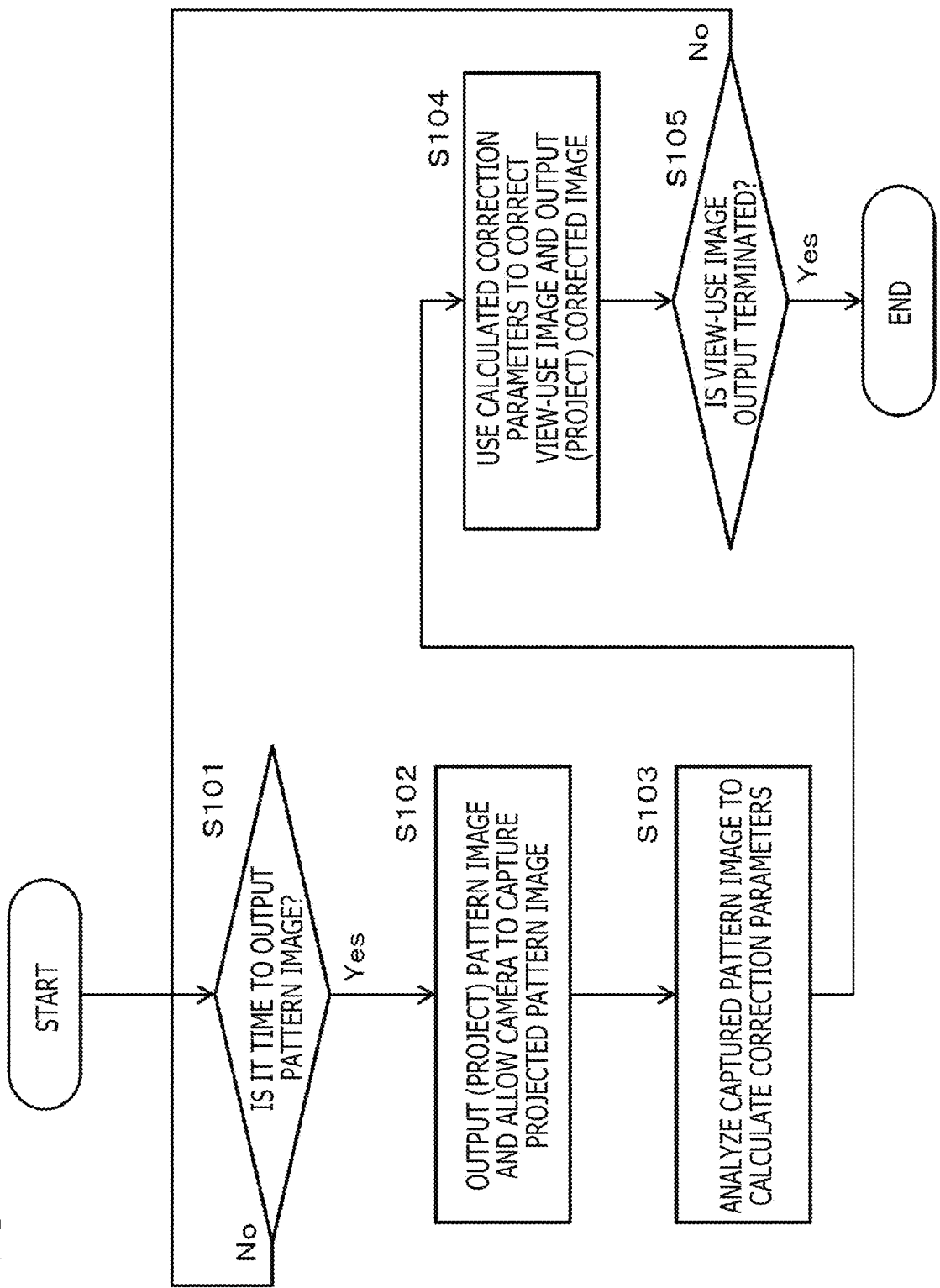
FIG. 18 is a diagram indicating a flowchart explanatory of a sequence of processes performed by the image processing apparatus of the present disclosure.

FIG. 18 is a flowchart explanatory of the sequence of the processes carried out by the image processing apparatus 100 of the present disclosure.

It is to be noted that, for example, the processes as per the flow depicted in FIG. 18 are executed according to a program stored in a storage section of the image processing apparatus 100, the execution being under control of a control section such as a CPU having the capability of executing programs.

The process of each of the steps in the flow indicated in FIG. 18 is explained sequentially below.
(Step S101)

First in step S101, the image processing apparatus 100 determines whether or not it is time to output the pattern image.

It is to be noted that the pattern image output timing is determined in advance. For example, as explained above with reference to FIGS. 6, 7A, and 7B, at the timing for starting a single image frame, the pattern image output period is, e.g., 1/256 or less of a single-frame output period.

In step S101, the output image control section 103 depicted in FIG. 4 determines whether or not it is time to output the pattern image.

It is to be noted that, as described above, the frames in which to display the pattern image may be either the entirety or a portion of the frames for displaying the view-use image. For example, only one frame for every tens of seconds to several minutes may be set as the pattern image display frame, with no other frame used for the pattern image display. The remaining frames may be used to display solely the normal view-use images.

In the case of determining that it is time to start a predetermined pattern image display frame, the output image control section 103 goes to step S102.
(Step S102)

In the case of determining in step S101 that it is time to start the predetermined pattern image display frame, the output image control section 103 in FIG. 4 goes to step S102, receives input of the pattern image from the pattern image output section 105, and outputs the input pattern image via the image projection section 104.

Further, in this pattern image output timing, the camera 106 is used to perform the process of capturing the pattern image.

The image capture control section 108 performs the image capture control process on the camera 106.

As described above with reference to FIG. 4, the image capture control section 108 receives input of the pattern image output timing information from the output image control section 103, and causes the camera 106 to capture the image, according to the input timing. This process allows the camera 106 to capture the projected pattern image.
(Step S103)

Next, in step S103, the pattern image captured by the camera 106 is used to calculate the parameters necessary for correcting the distortion of the projected image (i.e., correction parameters).

This process is carried out by the correction parameter calculation section 107.

The correction parameter calculation section 107 calculates the parameters required for distortion correction (correction parameters) by analyzing the projected pattern image captured by the camera 106.

For example, the correction parameter calculation section 107 analyzes the arrangement of the dots in the pattern image captured by the camera 106, etc. The analysis makes it possible to analyze where each of the pixels constituting the projected image is positioned on the screen when displayed thereon, for example. The result of the analysis is used to calculate the correction parameters for rectifying the distortion of the image displayed on the screen.

The correction parameters calculated by the correction parameter calculation section 107 are input to the image correction section 102.
(Step S104)

Next, in step S104, the process of correcting the view-use image is performed by use of the correction parameters calculated by the correction parameter calculation section 107 in step S103.

This process is carried out by the image correction section 102.

The image correction section 102 performs the correction process such as geometric transform on the view-use image with use of the correction parameters calculated by the correction parameter calculation section 107. The correction process enables the view-use image to be projected as an undistorted image as in the case where the image processing apparatus (projector) 100 is disposed directly in front of the screen.
(Step S105)

Lastly, in step S105, it is determined whether or not the process of view-use image projection is terminated.

In a case where the process is not terminated yet, the processes of step S101 and subsequent steps are carried out in repetition.

Also in a case where the direction of the image processing apparatus (projector) 100, etc. is diverted during image projection, for example, repeating the above processes allows new correction parameters to be calculated to deal with the diverted direction of the image processing apparatus 100, causes the image correction process to be executed using the calculated correction parameters, and permits continuous display of undistorted view-use images.

In a case where it is determined in step S105 that the view-use image projection process is terminated, the processing is brought to an end.

The image processing apparatus 100 of the present disclosure performs processing according to the sequence that follows the flow depicted in FIG. 18. By carrying out the processing in keeping with the sequence as per the flow, the image processing apparatus 100 of the present disclosure can execute the following series of processes without interrupting the presentation of the view-use image to the viewer.

(a) Pattern image display process,
(b) Pattern image camera capture process,
(c) Correction parameter calculation process, and
(d) View-use image correction process.

It is to be noted that the sequence explained above with referenced to FIG. 18 is a basic processing sequence of the processes carried out by the image processing apparatus 100 of the present disclosure.

Alternatively, the processes may be performed by use of multiple different pattern images, for example.

As discussed above with reference FIGS. 15A, 15B, 16, 17A, and 17B, there are diverse kinds of pattern images that can be used for calculating the correction parameters for correcting the distorted image. An optimum pattern image varies depending on the mode of distortion.

For example, there may be a case where the optimum correction parameters cannot be calculated using a single pattern image. In such a case, pattern images are switched for carrying out the processing.

A processing sequence including such a process of pattern image switchover is explained below with reference to the flowchart depicted in FIG. 19.

Figure 19:
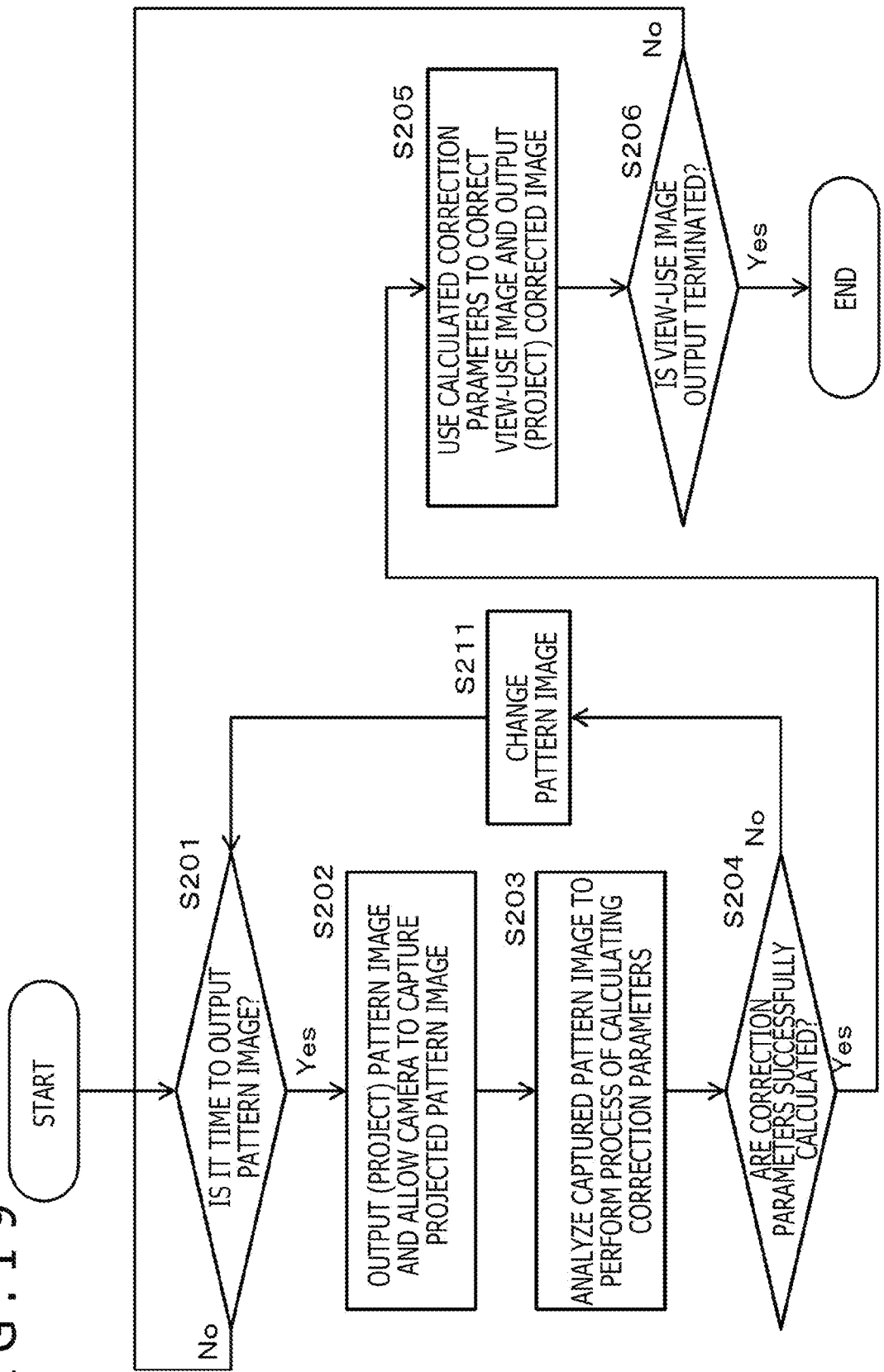
FIG. 19 is a diagram indicating a flowchart explanatory of a sequence of other processes performed by the image processing apparatus of the present disclosure.

The process of each of the steps in the flow indicated in FIG. 19 is explained sequentially below.
(Steps S201 Through S203)

The processes of step S201 through S203 are similar to those of steps S101 through S103 in the flow discussed above with reference to FIG. 18.

First, in step S201, the image processing apparatus 100 determines whether or not it is time to output the pattern image.

In a case of determining that it is time to start a predetermined pattern image display frame, the output image control section 103 goes to step S202.

In step S202, the output image control section 103 receives input of the pattern image from the pattern image output section 105 and outputs the input pattern image via the image projection section 104.

At this pattern image output timing, the output image control section 103 further causes the camera 106 to perform the pattern image capture process.

Next, in step S203, the pattern image captured by the camera 106 is used to perform the process of calculating the parameters necessary for correcting the distortion of the projected image (i.e., correction parameters).

This process is carried out by the correction parameter calculation section 107.

The correction parameter calculation section 107 analyzes the projected pattern image captured by the camera 106 and calculates the parameters (correction parameters) necessary for distortion correction accordingly.

However, there may be cases where the correction parameters cannot be calculated to deal with the mode of image distortion.
(Step S204)

In step S204, it is determined whether or not the correction parameters have been successfully calculated in step S203.

This process is also carried out by the correction parameter calculation section 107.

In a case where it is determined that the correction parameters have been successfully calculated, the process proceeds to step S205.

On the other hand, in a case where it is determined that the calculation of the correction parameters has failed, the process proceeds to step S211.
(Step S211)

In the case where it is determined in step S204 that the calculation of the correction parameters has failed, the process proceeds to step S211.

In step S211, the pattern image is changed.

This process is carried out by the pattern image output section 105.

In the case where it is determined that the calculation of the correction parameters has failed, the correction parameter calculation section 107 outputs control information (command) for changing the pattern image to be output to the pattern image output section 105.

Upon input of the control information (command) from the correction parameter calculation section 107, the pattern image output section 105 changes the pattern image to be output.

Thereafter, the process returns to step S201. The processes of steps S201 through S204 are carried out by use of the changed pattern image.

In a case where it is finally determined in step S204 that the correction parameters have been successfully calculated, the process proceeds to step S205.
(Step S205)

Next, in step S205, the view-use image correction process is performed by use of the correction parameters calculated by the correction parameter calculation section 107 in step S203.

This process is carried out by the image correction section 102.

The image correction section 102 performs the correction process such as geometric transform on the view-use image with use of the correction parameters calculated by the correction parameter calculation section 107. The correction process enables the view-use image to be projected as an undistorted image as in the case where the image processing apparatus (projector) 100 is disposed directly in front of the screen.
(Step S206)

Finally, in step S206, it is determined whether or not the view-use image projection process is terminated.

In a case where it is determined that the view-use image projection process is not terminated yet, step S201 and subsequent steps are carried out in repetition.

Also in a case where the direction of the image processing apparatus (projector) 100, etc. is diverted during image projection, for example, repeating the above processes allows new correction parameters to be calculated to deal with the diverted direction of the image processing apparatus 100, causes the image correction process to be executed using the calculated correction parameters, and permits continuous display of undistorted view-use images.

In a case where it is determined in step S206 that the view-use image projection process is terminated, the processing is brought to an end.

By carrying out the processing in keeping with the sequence following the flow depicted in FIG. 19, it is possible to calculate optimum correction parameters with use of the optimum pattern image for dealing with the images having diverse different modes of distortion and to thereby perform a highly accurate correction process on the diversely distorted images.

It is to be noted that, also in the case of performing the processing in keeping with the sequence as per the flow depicted in FIG. 19, the image processing apparatus 100 of the present disclosure can perform the following series of processes without interrupting the presentation of the view-use image to the viewer.
  (a) Pattern image display process,
  (b) Pattern image camera capture process,
  (c) Correction parameter calculation process, and
  (d) View-use image correction process.

7. Hardware Configuration Example of Image Processing Apparatus

Explained next is a specific example of the hardware configuration of the image processing apparatus according to the present disclosure.

FIG. 20 depicts a specific hardware configuration of the image processing apparatus of the present disclosure.

The constituent elements of the hardware configuration illustrated in FIG. 20 are explained below.

A CPU (Central Processing Unit) 301 functions as a data processing section that performs diverse processes according to programs stored in a ROM (Read Only Memory) 302 or in a storage section 308. For example, the CPU 301 carries out the processing in keeping with the sequence discussed in the above-described embodiments. A RAM (Random Access Memory) 303 stores the programs or data to be executed or operated on by the CPU 301. The CPU 301, the ROM 302, and the RAM 303 are interconnected via a bus 304.

The CPU 301 is connected to an input/output interface 305 via the bus 304. The Input/output interface 305 is connected to an input section 306 and an output section 307, the input section 306 including various switches, a keyboard, a touch panel, a mouse, a microphone, a camera, and the like, the output section 307 including a display, a speaker, and the like.

The output section 307 includes a projector that executes image output based on the PWM method.

The CPU 301 receives commands, status data, and the like input from the input section 306, performs diverse processes, and outputs the results of the processing to the output section 307, for example.

The storage section 308 connected to the input/output interface 305 includes a hard disk or the like, for example, and stores the programs or various kinds of data to be executed or operated on by the CPU 301. A communication section 309 functions as a transmission/reception section for data communication over a network such as the Internet or a local area network, the communication section 309 thus communicating with external apparatuses.

A drive 310 connected to the input/output interface 305 drives a removable medium 311 such as a magnetic disk, an optical disk, a magneto-optical disk, or a semiconductor memory such as a memory card. By driving the removable medium 311, the drive 310 writes or reads data thereto or therefrom.

8. Summary of Configurations of Present Disclosure

The present disclosure has been explained in detail with reference to specific embodiments. These embodiments, however, can obviously be modified diversely or replaced with some other appropriate embodiments by those skilled in the art without departing from the spirit and scope of the disclosure. That is, the present invention is disclosed using examples and should not be interpreted restrictively. The scope of the present disclosure should be determined by the appended claims, rather than by the examples given.

It is to be noted that the technology disclosed in the above description can be configured as follows.

(1)

An image processing apparatus including:

an image projection section configured to perform an image projection process based on a pulse width modulation (PWM) method;

an output image control section configured to set a portion of a single-frame output period of a view-use image as a period in which to output a pattern image to be used for calculating an image correction parameter;

a correction parameter calculation section configured to calculate the image correction parameter with use of the pattern image captured by a camera in the period in which to output the pattern image; and an image correction section configured to perform a correction process on the view-use image with use of the image correction parameter calculated by the correction parameter calculation section.

(2)

The image processing apparatus as stated in paragraph (1) above, in which the output image control section performs output control such that a portion of the single-frame output period of the view-use image is set as the period in which to output the pattern image and that a remaining portion of the single-frame output period is set as a period in which to output the view-use image.

(3)

The image processing apparatus as stated in paragraph (1) or (2) above, further including:

a camera configured to capture the pattern image; and an image capture control section configured to cause the camera to perform image capture in the period in which to output the pattern image.

(4)

The image processing apparatus as stated in any one of paragraphs (1) through (3) above, in which the output image control section controls the period in which to output the pattern image in such a manner that pixel values of the pattern image fall within a range from a minimum pixel value to less than a minimum significant pixel value of the view-use image.

(5)

The image processing apparatus as stated in any one of paragraphs (1) through (4) above, in which, in a case where the view-use image is set with eight-bit pixel values ranging from 0 to 255 as pixel values of pixels constituting the view-use image, the output image control section controls the period in which to output the pattern image in such a manner that pixel values of the pattern image fall within a range from a minimum pixel value of (0) to less than a minimum significant pixel value of (1) of the view-use image.

(6)

The image processing apparatus as stated in paragraph (1) above, in which the output image control section performs output control such that a portion of the single-frame output period of the view-use image is set as the period in which to output the pattern image and that a remaining portion of the single-frame output period is set as a period in which to output a composite image generated by combining the view-use image with the pattern image.

(7)

The image processing apparatus as stated in paragraph (6) above, in which the composite image is a composite image generated in such a manner that integrated pixel values of the pattern image and of the composite image output in the single-frame output period of the view-use image are substantially same as pixel values of the view-use image.

(8)

The image processing apparatus as stated in paragraph (1) above, in which the output image control section sets the period in which to output the pattern image in a preceding single-frame output period of the view-use image, the output image control section further setting a period in which to output a reverse image of the pattern image in a subsequent single-frame output period of the view-use image, and the correction parameter calculation section performs a correction parameter calculation process with use of a difference image between the pattern image captured in the preceding single-frame output period on one hand and the reverse image of the pattern image captured in the subsequent single-frame output period on the other hand.

(9)

The image processing apparatus as stated in any one of paragraphs (1) through (8) above, in which the output image control section switches multiple different pattern images to output a different pattern image.

(10)

An image processing method for execution by an image processing apparatus including an image projection section configured to perform an image projection process based on a pulse width modulation (PWM) method, the image processing method including:

an output image control step of causing an output image control section to set a portion of a single-frame output period of a view-use image as a period in which to output a pattern image to be used for calculating an image correction parameter;

a correction parameter calculation step of causing a correction parameter calculation section to calculate the image correction parameter with use of the pattern image captured by a camera in the period in which to output the pattern image; and an image correction step of causing an image correction section to perform a correction process on the view-use image with use of the image correction parameter calculated by the correction parameter calculation section.

(11)

A program for causing an image processing apparatus to perform image processing, the image processing apparatus including an image projection section configured to perform an image projection process based on a pulse width modulation (PWM) method, the program including:

an output image control step of causing the output image control section to set a portion of a single-frame output period of a view-use image as a period in which to output a pattern image to be used for calculating an image correction parameter;

a correction parameter calculation step of causing a correction parameter calculation section to calculate the image correction parameter with use of the pattern image captured by a camera in the period in which to output the pattern image; and an image correction step of causing an image correction section to perform a correction process on the view-use image with use of the image correction parameter calculated by the correction parameter calculation section.

Further, the series of the processes explained in this description can be executed either by hardware, by software, or by a combination of both. In the case where these processes are to be carried out by software, a program with processing sequences recorded therein is installed to a memory of a computer built with dedicated hardware and executed by the computer. Alternatively, the program may be installed to and executed by a general-purpose computer capable of performing diverse processes. For example, the program may be recorded beforehand on a recording medium. Besides being installed to the computer from the recording medium, the program can also be received over a network such as a LAN (Local Area Network) or the Internet and installed on the recording medium such as an internal hard disk.

It is to be noted that he processes discussed in this description may be executed not only chronologically in the depicted sequence but also parallelly or individually as needed or in keeping with the performance of the apparatus doing the execution. In this description, the term "system" refers to a logical aggregate configuration of multiple apparatuses. Further, the apparatuses in such a configuration may or may not be housed in a single enclosure.

INDUSTRIAL APPLICABILITY

As explained above, one embodiment of the present disclosure is configured to provide an apparatus and a method for calculating correction parameters through pattern image capture for image correction without interrupting the presentation of a view-use image projected by a projector.

Specifically, for example, the apparatus is configured to have an image projection section that performs an image projection process based on the pulse width modulation (PWM) method, an output image control section that sets a portion of a single-frame output period of a view-use image as a period in which to output a pattern image to be used for calculating an image correction parameter, a correction parameter calculation section that calculates the image correction parameter with use of the pattern image captured by a camera in the pattern image output period, and an image correction section that performs a correction process on the view-use image with use of the image correction parameter. For example, the output image control section controls the pattern image output period in such a manner that the pixel values of the pattern image fall within a range from a minimum pixel value to less than a minimum significant pixel value of the view-use image.

The above configuration thus provides an apparatus and a method to calculate correction parameters by capturing a pattern image and to correct images without interrupting the presentation of a view-use image projected by a projector.

REFERENCE SIGNS LIST

10: Screen
100: Image processing apparatus
101: View-use image output section
102: Image correction section
103: Output image control section
104: Image projection section
105: Pattern image output section
106: Camera
107: Correction parameter calculation section
108: Image capture control section
110: Projected image
301: CPU
302: ROM
303: RAM
304: Bus
305: Input/output interface
306: Input section
307: Output section
308: Storage section
309: Communication section
310: Drive
311: Removable medium

The invention claimed is:

1. An image processing apparatus, comprising:
an image projection section configured to execute an image projection process based on a pulse width modulation (PWM) method;
an output image control section configured to:
set a first portion of a first single-frame output period of a view-use image as a first period for output of a pattern image;
set a second portion of the first single-frame output period as a second period for output of the view-use image, wherein the second period of the first single-frame output period is different from the first period of the first single-frame output period; and
control output of the pattern image in the first period, and the view-use image in the second period; and
a correction parameter calculation section configured to:
receive, from a camera, a captured image of the pattern image output in the first period; and
calculate an image correction parameter based on the captured image of the pattern image; and
an image correction section configured to execute a correction process on the view-use image based on the calculated image correction parameter.

2. The image processing apparatus according to claim 1, further comprising:
the camera configured to capture the pattern image output in the first period; and
an image capture control section configured to control the camera to capture the pattern image in the first period in which the pattern image is output.

3. The image processing apparatus according to claim 1, wherein
the output image control section is further configured to control the first period of the output of the pattern image such that pixel values of the pattern image fall within a range from a minimum pixel value to less than a minimum significant pixel value of the view-use image.

4. The image processing apparatus according to claim 1, wherein,
in a case where the view-use image is set with eight-bit pixel values in a range from 0 to 255 as pixel values of pixels of the view-use image, the output image control section is further configured to control the first period of the output of the pattern image such that pixel values of the pattern image fall within a range from a minimum pixel value of (0) to less than a minimum significant pixel value of (1) of the view-use image.

5. The image processing apparatus according to claim 1, wherein
the output image control section is further configured to execute output control such that the second portion of the first single-frame output period is set as the second period to output a composite image that is a combination of the view-use image and the pattern image.

6. The image processing apparatus according to claim 5, wherein integrated pixel values of the pattern image and of the composite image output in the first single-frame output period of the view-use image are substantially same as pixel values of the view-use image.

7. The image processing apparatus according to claim 1, wherein
the output image control section is further configured to set a third period to output a reverse image of the pattern image in a second single-frame output period of the view-use image, wherein the second single-frame output period is subsequent to the first single-frame output period, and
the correction parameter calculation section is further configured to execute a correction parameter calculation process based on a difference image between the pattern image captured in the first single-frame output period and the reverse image of the pattern image captured in the second single-frame output period.

8. The image processing apparatus according to claim 1, wherein the output image control section is further configured to switch multiple different pattern images to output a different pattern image.

9. An image processing method, comprising:
executing an image projection process based on a pulse width modulation (PWM) method;
setting a first portion of a single-frame output period of a view-use image as a first period for output of a pattern image;
setting a second portion of the single-frame output period as a second period for output of the view-use image, wherein the second period of the single-frame output period is different from the first period of the single-frame output period;
controlling output of the pattern image in the first period, and the view-use image in the second period;
receiving, from a camera, a captured image of the pattern image output in the first period;
calculating an image correction parameter based on the captured image of the pattern image; and
executing a correction process on the view-use image based on the calculated image correction parameter.

10. A non-transitory computer-readable medium having stored thereon, computer-executable instructions which, when executed by a processor, cause the processor to execute operations, the operations comprising:
executing an image projection process based on a pulse width modulation (PWM) method;
setting a first portion of a single-frame output period of a view-use image as a first period for output of a pattern image;
setting a second portion of the single-frame output period as a second period for output of the view-use image, wherein the second period of the single-frame output period is different from the first period of the single-frame output period;
controlling output of the pattern image in the first period, and the view-use image in the second period;
receiving, from a camera, a captured image of the pattern image output in the first period;
calculating an image correction parameter based on the captured image of the pattern image; and
executing a correction process on the view-use image based on the calculated image correction parameter.

11. An image processing apparatus, comprising:
an image projection section configured to execute an image projection process based on a pulse width modulation (PWM) method;
an output image control section configured to:
set a portion of a single-frame output period of a view-use image as a period for output of a pattern image; and
control the period of the output of the pattern image such that pixel values of the pattern image fall within a range from a minimum pixel value to less than a minimum significant pixel value of the view-use image;

a correction parameter calculation section configured to:
　　receive a captured image of the pattern image from a camera, wherein the camera captures the pattern image in the period of output of the pattern image; and
　　calculate an image correction parameter based on the captured image of the pattern image; and
an image correction section configured to perform a correction process on the view-use image based on the image correction parameter.

12. An image processing apparatus, comprising:
an image projection section configured to execute an image projection process based on a pulse width modulation (PWM) method;
an output image control section configured to:
　　set a first portion of a first single-frame output period of a view-use image as a first period for output of a pattern image;
　　set a second portion of the first single-frame output period as a second period for output of a composite image, wherein
　　　the composite image is a combination of the view-use image and the pattern image, and
　　　the second period of the first single-frame output period is different from the first period of the first single-frame output period; and
　　control output of the pattern image in the first period, and the composite image in the second period; and
a correction parameter calculation section configured to:
　　receive, from a camera, a captured image of the pattern image output in the first period; and
　　calculate an image correction parameter based on the captured image of the pattern image; and
an image correction section configured to execute a correction process on the view-use image based on the calculated image correction parameter.

* * * * *